United States Patent
Baharav et al.

(10) Patent No.: US 9,557,846 B2
(45) Date of Patent: Jan. 31, 2017

(54) PRESSURE-SENSING TOUCH SYSTEM UTILIZING OPTICAL AND CAPACITIVE SYSTEMS

(71) Applicant: Corning Incorporated, Corning, NY (US)

(72) Inventors: Izhak Baharav, Palo Alto, CA (US); Jeffrey Stapleton King, Menlo Park, CA (US); Dragan Pikula, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/044,030

(22) Filed: Oct. 2, 2013

(65) Prior Publication Data
US 2014/0098058 A1    Apr. 10, 2014

Related U.S. Application Data

(60) Provisional application No. 61/744,878, filed on Oct. 4, 2012.

(51) Int. Cl.
| | |
|---|---|
| *G06F 3/041* | (2006.01) |
| *G06F 3/042* | (2006.01) |
| *G06F 3/044* | (2006.01) |

(52) U.S. Cl.
CPC .......... *G06F 3/0416* (2013.01); *G06F 3/044* (2013.01); *G06F 3/0421* (2013.01)

(58) Field of Classification Search
CPC ...... G06F 3/038; G06F 3/0304; G06F 3/0383; G06F 3/0317; G06F 3/03543; G06F 3/04883; G06F 3/03547; G06F 1/1626; G06F 3/041; G06F 3/044; G06F 3/0386; G06F 3/045; G06F 3/03545; G06F 3/0416; G06F 3/0421; G08C 21/00
(Continued)

(56) References Cited

U.S. PATENT DOCUMENTS

| | | |
|---|---|---|
| 3,333,160 A | 7/1967 | Gorski |
| 3,541,541 A | 11/1970 | Engelbart |

(Continued)

FOREIGN PATENT DOCUMENTS

| | | |
|---|---|---|
| EP | 1059604 | 12/2000 |
| EP | 0901229 | 6/2007 |

(Continued)

OTHER PUBLICATIONS

Machine translation of JP2011-103094.
(Continued)

*Primary Examiner* — Md Saiful A Siddiqui
(74) *Attorney, Agent, or Firm* — Jason A. Barron; Joseph E. Gortych

(57) ABSTRACT

A hybrid touch system that utilizes a combination of a capacitive touch system for position sensing and an optical touch system for pressure sensing is disclosed. The optical touch system includes a transparent sheet having a surface, at least one light source and at least one detector which are operably arranged relative to the transparent sheet to transmit light through the sheet and to detect the transmitted light. Performing position sensing using the capacitive touch system simplifies the pressure-sensing optical touch system.

17 Claims, 23 Drawing Sheets

(58) Field of Classification Search
USPC .......... 345/166, 173–179; 178/18.06, 18.09
See application file for complete search history.

(56) References Cited

U.S. PATENT DOCUMENTS

| | | | |
|---|---|---|---|
| 3,662,105 A | 5/1972 | Hurst et al. | |
| 3,798,370 A | 3/1974 | Hurst | |
| 4,246,452 A | 1/1981 | Chandler | |
| 4,346,376 A | 8/1982 | Mallos | |
| 4,484,179 A | 11/1984 | Kasday | 340/365 |
| 4,511,760 A | 4/1985 | Garwin et al. | 178/18 |
| 4,542,375 A | 9/1985 | Alles et al. | 340/712 |
| 4,550,221 A | 10/1985 | Mabusth | |
| 4,672,364 A | 6/1987 | Lucas | |
| 4,672,558 A | 6/1987 | Beckes et al. | |
| 4,687,885 A | 8/1987 | Talmage, Jr. et al. | 178/18 |
| 4,692,809 A | 9/1987 | Beining et al. | |
| 4,695,827 A | 9/1987 | Beining et al. | |
| 4,725,978 A | 2/1988 | Fujioka | 364/900 |
| 4,733,222 A | 3/1988 | Evans | |
| 4,734,685 A | 3/1988 | Watanabe | |
| 4,746,770 A | 5/1988 | McAvinney | |
| 4,771,276 A | 9/1988 | Parks | |
| 4,788,384 A | 11/1988 | Bruere-Dawson et al. | |
| 4,806,846 A | 2/1989 | Kerber | |
| 4,898,555 A | 2/1990 | Sampson | |
| 4,914,624 A | 4/1990 | Dunthorn | |
| 4,968,877 A | 11/1990 | McAvinney et al. | |
| 5,003,519 A | 3/1991 | Noirjean | |
| 5,017,030 A | 5/1991 | Crews | |
| 5,178,477 A | 1/1993 | Gambaro | |
| 5,189,403 A | 2/1993 | Franz et al. | |
| 5,194,862 A | 3/1993 | Edwards | |
| 5,222,400 A | 6/1993 | Hilton | 73/862.043 |
| 5,224,861 A | 7/1993 | Glass et al. | |
| 5,241,308 A | 8/1993 | Young | |
| 5,252,951 A | 10/1993 | Tannenbaum et al. | |
| 5,281,966 A | 1/1994 | Walsh | |
| 5,305,017 A | 4/1994 | Gerpheide | |
| 5,345,543 A | 9/1994 | Capps et al. | |
| 5,376,948 A | 12/1994 | Roberts | |
| 5,398,310 A | 3/1995 | Tchao et al. | |
| 5,442,742 A | 8/1995 | Greyson et al. | |
| 5,446,480 A | 8/1995 | Yoshida | 345/157 |
| 5,462,108 A | 10/1995 | Katoh et al. | |
| 5,463,388 A | 10/1995 | Boie et al. | |
| 5,463,696 A | 10/1995 | Beernink et al. | |
| 5,483,261 A | 1/1996 | Yasutake | |
| 5,488,204 A | 1/1996 | Mead et al. | |
| 5,495,077 A | 2/1996 | Miller et al. | |
| 5,513,309 A | 4/1996 | Meier et al. | |
| 5,523,775 A | 6/1996 | Capps | |
| 5,530,455 A | 6/1996 | Gillick et al. | |
| 5,543,590 A | 8/1996 | Gillespie et al. | |
| 5,543,591 A | 8/1996 | Gillespie et al. | |
| 5,563,632 A | 10/1996 | Roberts | |
| 5,563,996 A | 10/1996 | Tchao | |
| 5,565,658 A | 10/1996 | Gerpheide et al. | |
| 5,579,036 A | 11/1996 | Yates, IV | |
| 5,581,681 A | 12/1996 | Tchao et al. | |
| 5,583,946 A | 12/1996 | Gourdol | |
| 5,589,856 A | 12/1996 | Stein et al. | |
| 5,590,219 A | 12/1996 | Gourdol | |
| 5,592,566 A | 1/1997 | Pagallo et al. | |
| 5,594,810 A | 1/1997 | Gourdol | |
| 5,596,694 A | 1/1997 | Capps | |
| 5,610,629 A | 3/1997 | Baur | 345/104 |
| 5,612,719 A | 3/1997 | Beernink et al. | |
| 5,631,805 A | 5/1997 | Bonsall | |
| 5,633,955 A | 5/1997 | Bozinovic et al. | |
| 5,634,102 A | 5/1997 | Capps | |
| 5,636,101 A | 6/1997 | Bonsall et al. | |
| 5,644,657 A | 7/1997 | Capps et al. | |
| 5,650,597 A | 7/1997 | Redmayne | |
| 5,666,113 A | 9/1997 | Logan | |
| 5,666,502 A | 9/1997 | Capps | |
| 5,666,552 A | 9/1997 | Greyson et al. | |
| 5,675,361 A | 10/1997 | Santilli | |
| 5,677,710 A | 10/1997 | Thompson-Rohrlich | |
| 5,689,253 A | 11/1997 | Hargreaves et al. | |
| 5,710,844 A | 1/1998 | Capps et al. | |
| 5,729,250 A | 3/1998 | Bishop et al. | |
| 5,730,165 A | 3/1998 | Philipp | |
| 5,736,976 A | 4/1998 | Cheung | |
| 5,741,990 A | 4/1998 | Davies | |
| 5,745,116 A | 4/1998 | Pisutha-Arnond | |
| 5,745,716 A | 4/1998 | Tchao et al. | |
| 5,746,818 A | 5/1998 | Yatake | |
| 5,748,269 A | 5/1998 | Harris et al. | |
| 5,764,222 A | 6/1998 | Shieh | |
| 5,767,547 A | 6/1998 | Merchant et al. | |
| 5,767,842 A | 6/1998 | Korth | |
| 5,790,104 A | 8/1998 | Shieh | |
| 5,790,107 A | 8/1998 | Kasser et al. | |
| 5,802,516 A | 9/1998 | Shwarts et al. | |
| 5,808,567 A | 9/1998 | McCloud | |
| 5,809,267 A | 9/1998 | Moran et al. | |
| 5,821,690 A | 10/1998 | Martens et al. | |
| 5,823,782 A | 10/1998 | Marcus et al. | |
| 5,825,351 A | 10/1998 | Tam | |
| 5,825,352 A | 10/1998 | Bisset et al. | |
| 5,854,625 A | 12/1998 | Frisch et al. | |
| 5,880,411 A | 3/1999 | Gillespie et al. | |
| 5,898,434 A | 4/1999 | Small et al. | |
| 5,920,309 A | 7/1999 | Bisset et al. | |
| 5,923,319 A | 7/1999 | Bishop et al. | |
| 5,933,134 A | 8/1999 | Shieh | |
| 5,942,733 A | 8/1999 | Allen et al. | |
| 5,943,044 A | 8/1999 | Martinelli et al. | |
| 6,002,389 A | 12/1999 | Kasser | |
| 6,002,808 A | 12/1999 | Freeman | |
| 6,020,881 A | 2/2000 | Naughton et al. | |
| 6,031,520 A | 2/2000 | De Gotari | 345/157 |
| 6,031,524 A | 2/2000 | Kunert | |
| 6,037,882 A | 3/2000 | Levy | |
| 6,050,825 A | 4/2000 | Nichol et al. | |
| 6,052,339 A | 4/2000 | Frenkel et al. | |
| 6,061,177 A | 5/2000 | Fujimoto | |
| 6,072,494 A | 6/2000 | Nguyen | |
| 6,084,571 A | 7/2000 | De Gotari | 345/157 |
| 6,084,576 A | 7/2000 | Leu et al. | |
| 6,107,997 A | 8/2000 | Ure | |
| 6,128,003 A | 10/2000 | Smith et al. | |
| 6,131,299 A | 10/2000 | Raab et al. | |
| 6,135,958 A | 10/2000 | Mikula-Curtis et al. | |
| 6,144,380 A | 11/2000 | Shwarts et al. | |
| 6,188,391 B1 | 2/2001 | Seely et al. | |
| 6,198,515 B1 | 3/2001 | Cole | |
| 6,208,329 B1 | 3/2001 | Ballare | |
| 6,222,465 B1 | 4/2001 | Kumar et al. | |
| 6,239,790 B1 | 5/2001 | Martinelli et al. | |
| 6,243,071 B1 | 6/2001 | Shwarts et al. | |
| 6,246,862 B1 | 6/2001 | Grivas et al. | |
| 6,249,606 B1 | 6/2001 | Kiraly et al. | |
| 6,288,707 B1 | 9/2001 | Philipp | |
| 6,289,326 B1 | 9/2001 | LaFleur | |
| 6,292,178 B1 | 9/2001 | Bernstein et al. | |
| 6,323,846 B1 | 11/2001 | Westerman et al. | |
| 6,326,948 B1 | 12/2001 | Kobachi et al. | 345/157 |
| 6,337,678 B1 | 1/2002 | Fish | |
| 6,347,290 B1 | 2/2002 | Bartlett | |
| 6,373,265 B1 | 4/2002 | Morimoto et al. | |
| 6,377,009 B1 | 4/2002 | Philipp | |
| 6,380,931 B1 | 4/2002 | Gillespie et al. | |
| 6,411,287 B1 | 6/2002 | Scharff et al. | |
| 6,414,671 B1 | 7/2002 | Gillespie et al. | |
| 6,421,234 B1 | 7/2002 | Ricks et al. | |
| 6,452,514 B1 | 9/2002 | Philipp | |
| 6,457,355 B1 | 10/2002 | Philipp | |
| 6,466,036 B1 | 10/2002 | Philipp | |
| 6,504,530 B1 | 1/2003 | Wilson et al. | 345/173 |
| 6,515,669 B1 | 2/2003 | Mohri | |
| 6,525,749 B1 | 2/2003 | Moran et al. | |
| 6,535,200 B2 | 3/2003 | Philipp | |

(56) References Cited

U.S. PATENT DOCUMENTS

| | | |
|---|---|---|
| 6,543,684 B1 | 4/2003 | White et al. |
| 6,543,947 B2 | 4/2003 | Lee |
| 6,556,149 B1 | 4/2003 | Reimer et al. ............... 341/20 |
| 6,570,557 B1 | 5/2003 | Westerman et al. |
| 6,593,916 B1 | 7/2003 | Aroyan |
| 6,610,936 B2 | 8/2003 | Gillespie et al. |
| 6,624,833 B1 | 9/2003 | Kumar et al. |
| 6,639,577 B2 | 10/2003 | Eberhard |
| 6,650,319 B1 | 11/2003 | Hurst et al. |
| 6,658,994 B1 | 12/2003 | McMillan |
| 6,670,894 B2 | 12/2003 | Mehring |
| 6,677,932 B1 | 1/2004 | Westerman |
| 6,677,934 B1 | 1/2004 | Blanchard |
| 6,723,929 B2 | 4/2004 | Kent |
| 6,724,366 B2 | 4/2004 | Crawford |
| 6,757,002 B1 | 6/2004 | Oross et al. |
| 6,788,295 B1 | 9/2004 | Inkster ........................ 345/175 |
| 6,803,906 B1 | 10/2004 | Morrison et al. |
| 6,804,012 B2 | 10/2004 | Gombert ...................... 356/614 |
| 6,816,537 B2 | 11/2004 | Liess ........................... 372/109 |
| 6,842,672 B1 | 1/2005 | Straub et al. |
| 6,856,259 B1 | 2/2005 | Sharp |
| 6,888,536 B2 | 5/2005 | Westerman et al. |
| 6,900,795 B1 | 5/2005 | Knight, III et al. ......... 345/173 |
| 6,927,761 B2 | 8/2005 | Badaye et al. |
| 6,942,571 B1 | 9/2005 | McAllister et al. |
| 6,965,375 B1 | 11/2005 | Gettemy et al. |
| 6,972,401 B2 | 12/2005 | Akitt et al. |
| 6,977,666 B1 | 12/2005 | Hedrick |
| 6,985,801 B1 | 1/2006 | Straub et al. |
| 6,992,659 B2 | 1/2006 | Gettemy |
| 7,030,860 B1 | 4/2006 | Hsu et al. |
| 7,031,228 B2 | 4/2006 | Born et al. |
| 7,157,649 B2 | 1/2007 | Hill ............................. 178/18.04 |
| 7,158,054 B2 | 1/2007 | Pihlaja ......................... 341/22 |
| 7,208,259 B2 | 4/2007 | Badesha et al. |
| 7,298,367 B2 | 11/2007 | Geaghan et al. |
| 7,417,627 B2 | 8/2008 | Cok .............................. 345/173 |
| 7,432,893 B2 | 10/2008 | Ma et al. |
| 7,442,914 B2 | 10/2008 | Eliasson et al. |
| 7,515,140 B2 | 4/2009 | Philipp ........................ 345/173 |
| 7,663,607 B2 | 2/2010 | Hotelling et al. |
| 7,666,511 B2 | 2/2010 | Ellison et al. |
| 7,685,538 B2 | 3/2010 | Fleck et al. ................. 715/863 |
| 7,705,835 B2 | 4/2010 | Eikman |
| 7,786,978 B2 | 8/2010 | Lapstun et al. .............. 345/166 |
| 7,903,090 B2 | 3/2011 | Soss et al. ................... 345/173 |
| 7,920,124 B2 | 4/2011 | Tokita et al. ................ 345/156 |
| 7,966,578 B2 | 6/2011 | Tolmasky et al. |
| 8,049,739 B2 | 11/2011 | Wu et al. ..................... 345/175 |
| 8,075,999 B2 | 12/2011 | Barefoot et al. |
| 8,130,210 B2 | 3/2012 | Saxena et al. ............... 345/175 |
| 8,158,543 B2 | 4/2012 | Dejneka et al. |
| 8,168,908 B2 | 5/2012 | Heimann |
| 8,174,510 B2 | 5/2012 | Polishchuk et al. |
| 8,179,375 B2 | 5/2012 | Ciesla et al. ................. 345/173 |
| 8,187,987 B2 | 5/2012 | Amin et al. |
| 8,199,123 B2 | 6/2012 | Jiang et al. |
| 8,199,127 B2 | 6/2012 | Mamba et al. |
| 8,201,109 B2 | 6/2012 | Van Os et al. |
| 8,206,047 B1 | 6/2012 | Isaac et al. |
| 8,209,630 B2 | 6/2012 | Thimbleby et al. |
| 8,217,913 B2 | 7/2012 | Hotelling et al. |
| 8,217,915 B2 | 7/2012 | Philipp |
| 8,223,133 B2 | 7/2012 | Hristov |
| 8,228,305 B2 | 7/2012 | Pryor |
| 8,228,308 B2 | 7/2012 | Jiang et al. |
| 8,232,970 B2 | 7/2012 | Krah et al. |
| RE43,606 E | 8/2012 | Bruwer |
| 8,235,460 B2 | 8/2012 | Plavetich et al. |
| 8,237,456 B2 | 8/2012 | Dubery |
| 8,237,667 B2 | 8/2012 | Krah |
| 8,237,668 B2 | 8/2012 | Jiang et al. |
| 8,237,669 B2 | 8/2012 | Jiang et al. |
| 8,237,670 B2 | 8/2012 | Jiang et al. |
| 8,237,671 B2 | 8/2012 | Jiang et al. |
| 8,237,672 B2 | 8/2012 | Jiang et al. |
| 8,237,673 B2 | 8/2012 | Jiang et al. |
| 8,237,674 B2 | 8/2012 | Jiang et al. |
| 8,237,675 B2 | 8/2012 | Jiang et al. |
| 8,237,677 B2 | 8/2012 | Jiang et al. |
| 8,237,679 B2 | 8/2012 | Jiang et al. |
| 8,237,680 B2 | 8/2012 | Jiang et al. |
| 8,239,784 B2 | 8/2012 | Hotelling et al. |
| 8,243,029 B2 | 8/2012 | Jiang et al. |
| 8,243,030 B2 | 8/2012 | Jiang et al. |
| 8,248,377 B2 | 8/2012 | Jiang et al. |
| 8,248,378 B2 | 8/2012 | Jiang et al. |
| 8,248,379 B2 | 8/2012 | Liu et al. |
| 8,248,380 B2 | 8/2012 | Jiang et al. |
| 8,248,381 B2 | 8/2012 | Jiang et al. |
| 8,248,661 B2 | 8/2012 | Wang et al. |
| 8,250,724 B2 | 8/2012 | Dabov et al. |
| 8,253,700 B2 | 8/2012 | Jiang et al. |
| 8,253,701 B2 | 8/2012 | Liu et al. |
| 8,253,706 B2 | 8/2012 | Simmons |
| 8,253,712 B2 | 8/2012 | Klinghult ..................... 345/174 |
| 8,255,003 B2 | 8/2012 | Forstall et al. |
| 8,255,830 B2 | 8/2012 | Ording et al. |
| 8,258,986 B2 | 9/2012 | Makovetskyy |
| 8,260,378 B2 | 9/2012 | Jiang et al. |
| 8,266,529 B2 | 9/2012 | Ooi et al. |
| 8,274,488 B2 | 9/2012 | Bae |
| 8,274,492 B2 | 9/2012 | Hotelling et al. |
| 8,279,176 B2 | 10/2012 | Krah et al. |
| 8,279,180 B2 | 10/2012 | Hotelling et al. |
| 8,279,189 B2 | 10/2012 | Yilmaz |
| 8,279,201 B2 | 10/2012 | Kang et al. |
| 8,325,158 B2 | 12/2012 | Yatsuda et al. .............. 345/176 |
| 8,368,677 B2 | 2/2013 | Yamamoto .................... 345/207 |
| 8,378,975 B2 | 2/2013 | Yoon et al. ................... 345/173 |
| 8,390,481 B2 | 3/2013 | Pance et al. .................. 341/33 |
| 8,395,601 B2 | 3/2013 | Nho et al. ..................... 345/176 |
| 8,411,068 B2 | 4/2013 | Lu et al. ....................... 345/175 |
| 8,553,014 B2 | 10/2013 | Holmgren et al. .......... 345/176 |
| 9,046,961 B2 | 6/2015 | King et al. |
| 9,213,445 B2 | 12/2015 | King et al. |
| 2001/0007449 A1 | 7/2001 | Kobachi et al. .............. 345/156 |
| 2002/0015024 A1 | 2/2002 | Westerman et al. |
| 2002/0118848 A1 | 8/2002 | Karpenstein |
| 2003/0006974 A1 | 1/2003 | Clough et al. |
| 2003/0026971 A1 | 2/2003 | Inkster et al. ............... 428/304.4 |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0095095 A1 | 5/2003 | Pihlaja |
| 2003/0095096 A1 | 5/2003 | Robbin et al. |
| 2003/0098358 A1 | 5/2003 | Perski et al. |
| 2003/0206202 A1 | 11/2003 | Moriya |
| 2003/0234768 A1 | 12/2003 | Rekimoto et al. |
| 2003/0234770 A1 | 12/2003 | MacKey |
| 2004/0227736 A1 | 11/2004 | Kamrath et al. |
| 2004/0252091 A1* | 12/2004 | Ma et al. ........................ 345/87 |
| 2004/0263484 A1 | 12/2004 | Mantysalo et al. |
| 2005/0007349 A1 | 1/2005 | Vakil et al. |
| 2005/0012723 A1 | 1/2005 | Pallakoff |
| 2005/0052425 A1 | 3/2005 | Zadesky et al. |
| 2005/0083307 A1 | 4/2005 | Aufderheide et al. |
| 2005/0104867 A1 | 5/2005 | Westerman et al. |
| 2005/0110768 A1 | 5/2005 | Marriott et al. |
| 2005/0146511 A1 | 7/2005 | Hill et al. |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033724 A1 | 2/2006 | Chaudhri et al. |
| 2006/0053387 A1 | 3/2006 | Ording |
| 2006/0066582 A1 | 3/2006 | Lyon et al. |
| 2006/0085757 A1 | 4/2006 | Andre et al. |
| 2006/0096392 A1 | 5/2006 | Inkster et al. ............ 73/862.041 |
| 2006/0097991 A1 | 5/2006 | Hotelling et al. |
| 2006/0158437 A1 | 7/2006 | Blythe et al. |

(56) References Cited

U.S. PATENT DOCUMENTS

| | | |
|---|---|---|
| 2006/0197753 A1 | 9/2006 | Hotelling |
| 2006/0227120 A1 | 10/2006 | Eikman .......................... 345/175 |
| 2008/0007540 A1* | 1/2008 | Ostergaard ................... 345/176 |
| 2008/0007542 A1* | 1/2008 | Eliasson et al. ............. 345/176 |
| 2008/0068343 A1 | 3/2008 | Hoshino et al. ............. 345/173 |
| 2008/0088597 A1 | 4/2008 | Prest et al. ................... 345/173 |
| 2008/0088600 A1 | 4/2008 | Prest et al. ................... 345/173 |
| 2008/0252616 A1 | 10/2008 | Chen ............................ 345/175 |
| 2008/0284742 A1 | 11/2008 | Prest et al. ................... 345/173 |
| 2008/0289884 A1 | 11/2008 | Elwell ........................ 178/18.01 |
| 2008/0303797 A1 | 12/2008 | Grothe .......................... 345/173 |
| 2009/0015564 A1 | 1/2009 | Ye et al. ....................... 345/173 |
| 2009/0128499 A1 | 5/2009 | Izadi et al. .................. 345/173 |
| 2009/0153519 A1 | 6/2009 | Suarez Rovere |
| 2009/0219253 A1 | 9/2009 | Izadi et al. .................. 345/173 |
| 2009/0219261 A1 | 9/2009 | Jacobson et al. ............. 345/175 |
| 2009/0309616 A1* | 12/2009 | Klinghult et al. ............ 324/686 |
| 2010/0001973 A1 | 1/2010 | Hotelling et al. |
| 2010/0001978 A1 | 1/2010 | Lynch et al. ................. 345/175 |
| 2010/0053098 A1 | 3/2010 | Tsuzaki et al. ............... 345/173 |
| 2010/0060548 A1 | 3/2010 | Choi et al. ..................... 345/1.3 |
| 2010/0079407 A1 | 4/2010 | Suggs |
| 2010/0103123 A1 | 4/2010 | Cohen et al. ................. 345/173 |
| 2010/0103140 A1 | 4/2010 | Hansson ....................... 345/175 |
| 2010/0117974 A1 | 5/2010 | Joguet et al. ................. 345/173 |
| 2010/0117989 A1 | 5/2010 | Chang |
| 2010/0156847 A1 | 6/2010 | No et al. ....................... 345/175 |
| 2010/0177060 A1 | 7/2010 | Han |
| 2010/0182168 A1 | 7/2010 | Van De Wijdeven et al. |
| 2010/0207906 A1 | 8/2010 | Anglin et al. ................. 345/174 |
| 2010/0245288 A1 | 9/2010 | Harris ............................ 345/175 |
| 2010/0253650 A1 | 10/2010 | Dietzel et al. ................ 345/175 |
| 2010/0277431 A1* | 11/2010 | Klinghult ...................... 345/174 |
| 2010/0295821 A1 | 11/2010 | Chang et al. |
| 2010/0321310 A1 | 12/2010 | Kim et al. .................... 345/173 |
| 2011/0096025 A1 | 4/2011 | Slobodin et al. ............. 345/174 |
| 2011/0122091 A1 | 5/2011 | King et al. |
| 2011/0141053 A1 | 6/2011 | Bulea et al. .................. 345/174 |
| 2011/0148819 A1 | 6/2011 | Yu |
| 2011/0157092 A1 | 6/2011 | Yang ............................. 345/175 |
| 2011/0163997 A1 | 7/2011 | Kim |
| 2011/0199340 A1 | 8/2011 | Aikio et al. |
| 2011/0221997 A1 | 9/2011 | Kim et al. |
| 2011/0227874 A1 | 9/2011 | F hraeus et al. |
| 2011/0234537 A1 | 9/2011 | Kim et al. |
| 2011/0279409 A1* | 11/2011 | Salaverry et al. ............ 345/174 |
| 2011/0298742 A1 | 12/2011 | Dingnan ....................... 345/173 |
| 2011/0304567 A1* | 12/2011 | Yamamoto et al. .......... 345/173 |
| 2012/0038593 A1 | 2/2012 | R nk et al. |
| 2012/0068939 A1 | 3/2012 | Pemberton-Pigott ........ 345/173 |
| 2012/0068970 A1 | 3/2012 | Pemberton-Pigott ........ 345/175 |
| 2012/0068971 A1 | 3/2012 | Pemberton-Pigott ........ 345/175 |
| 2012/0071206 A1 | 3/2012 | Pemberton-Pigott ........ 455/566 |
| 2012/0086666 A1* | 4/2012 | Badaye et al. ................ 345/174 |
| 2012/0092250 A1 | 4/2012 | Hadas et al. .................. 345/156 |
| 2012/0176345 A1 | 7/2012 | Ye et al. ....................... 345/175 |
| 2012/0212451 A1 | 8/2012 | Large et al. ................... 345/175 |
| 2012/0242607 A1 | 9/2012 | Ciesla et al. .................. 345/173 |
| 2012/0320385 A1* | 12/2012 | Mu et al. ....................... 356/624 |
| 2012/0326981 A1 | 12/2012 | Kurose .......................... 345/160 |
| 2013/0107306 A1 | 5/2013 | Yoon et al. .................. 358/1.13 |
| 2013/0135254 A1 | 5/2013 | Lee et al. |

FOREIGN PATENT DOCUMENTS

| | | |
|---|---|---|
| EP | 2392904 | 12/2011 |
| EP | 2437144 | 4/2012 |
| EP | 2437145 | 4/2012 |
| EP | 2439620 | 4/2012 |
| EP | 2439619 | 5/2012 |
| FR | 2963839 | 8/2010 |
| GB | 2313195 | 11/1997 |
| JP | 2011103094 | 5/2011 |
| WO | 02/35460 | 5/2002 |
| WO | 0235461 | 5/2002 |
| WO | 2006/115946 | 11/2006 |
| WO | 2010/063320 | 6/2010 |
| WO | 2011028169 A1 | 3/2011 |
| WO | 2011028170 A1 | 3/2011 |
| WO | 2011066100 A2 | 6/2011 |
| WO | 2011078769 A1 | 6/2011 |
| WO | 2011095638 A2 | 8/2011 |
| WO | 2011139213 A1 | 11/2011 |
| WO | 2012/027599 | 3/2012 |
| WO | 2012/087286 | 6/2012 |
| WO | 201316749 A1 | 2/2013 |
| WO | 2013/029641 | 3/2013 |
| WO | 2013/037385 | 3/2013 |
| WO | 2013/068651 | 5/2013 |

OTHER PUBLICATIONS

Machine translation of FR2963839.
International Search Report of the International Searching Authority; PCT/US2013/063350.
Kodl; "A New Optical Waveguide Pressure Sensor Using Evanescent Field"; 2004 Electronic Components and Technology Conference; 2004 IEEE; p. 1943-1946.
Koeppe; "Hit the Spot"; Soft Matter Physics Group, MRS Spring Meeting 2009, 18 Pages.
Sumriddetchkajorn et al; "Ultra-High-Contrast Low-Leakage-Light Optical Touch Device Structures Using Light Scattering and Total Internal Reflection Concepts"; Sensors and Actuators A, 126 (2006) pp. 68-72.

* cited by examiner

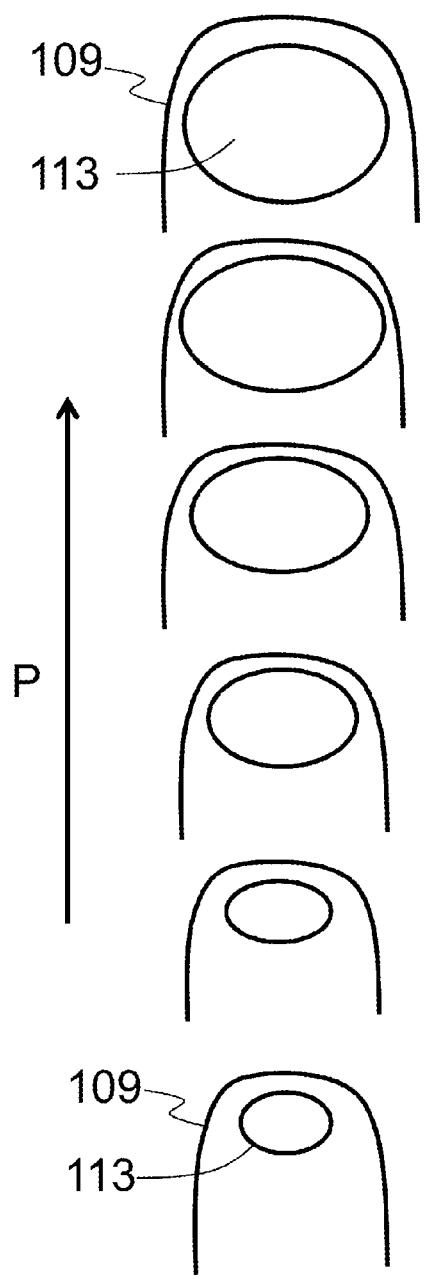
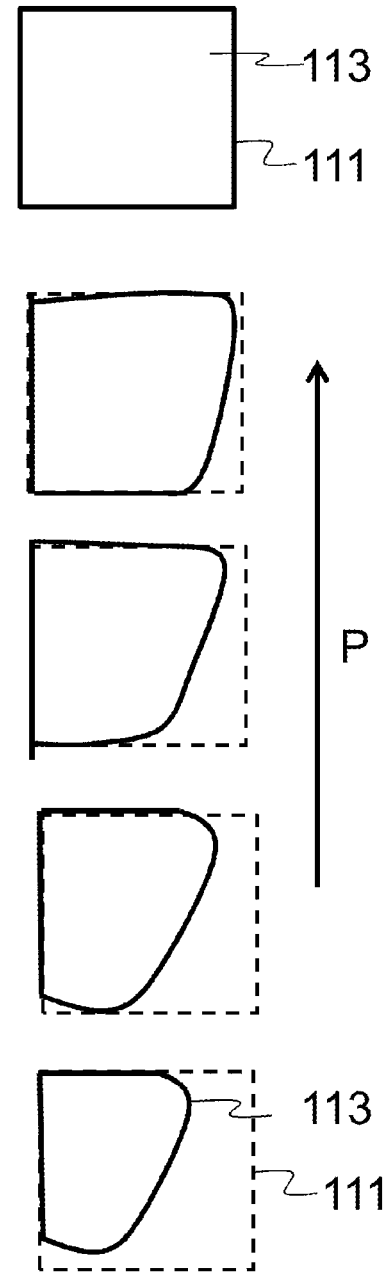
*FIG. 8A*  *FIG. 8B*

PRESSURE-SENSING TOUCH SYSTEM UTILIZING OPTICAL AND CAPACITIVE SYSTEMS

CROSS-REFERENCE TO RELATED APPLICATIONS

This application claims the benefit of priority under 35 U.S.C. §119(e) of U.S. Provisional Application Ser. No. 61/744,878, filed Oct. 4, 2012, and which is incorporated by reference herein.

FIELD

The present invention relates to touch-sensitive devices, and in particular to hybrid touch systems that utilize the total-internal reflection of light in an optics-based touch system to measure touch pressure associated with a touch event, in combination with capacitive sensing technologies that measure the touch location of the touch event.

BACKGROUND ART

The market for displays and other devices (e.g., keyboards) having non-mechanical touch functionality is rapidly growing. As a result, a variety of touch-sensing techniques has been developed to enable displays and other devices to have touch functionality. Touch-sensing functionality is gaining wider use in mobile device applications, such as smart phones, e-book readers, laptop computers and tablet computers.

Touch systems in the form of touch screens have been developed that respond to a variety of types of touches, such as single touches, multiple touches, swiping, and touches having different pressures. However, pressure-sensing touch screens and other touch systems typically rely on conventional pressure sensors to sense the touch pressure and are thus relatively complex and expensive to manufacture.

SUMMARY

An aspect of the disclosure comprises a hybrid touch system for sensing both the touch location of a touch event and the amount of pressure at the touch location of the touch event. The hybrid touch system comprises a capacitive touch sensor; an optical touch sensor; a software means for utilizing the capacitive touch sensor to determine an x- and y-location of the touch event; and a software means for utilizing the optical touch sensor to determine pressure at the location of the touch event. In some embodiments, the optical touch sensor comprises a total internal reflection-based touch sensor.

In some embodiments, the optical touch sensor comprises a transparent sheet having a top surface, a bottom surface, and a perimeter that includes an edge, wherein the touch event occurs on the top surface at a touch event location; at least one light source operably arranged relative to the transparent sheet and that emits light that is coupled into the transparent sheet so that the light travels via total internal reflection; and at least one detector operably disposed relative to the transparent sheet and the light source and to generate an detector electrical signal having a signal strength representative of a detected intensity of light traveling within the transparent sheet, wherein the touch event causes a change in the detected light intensity that corresponds to a change in amount of pressure applied at the touch event location.

In some embodiments, the optical touch sensor further comprises a controller operably coupled to the at least one light source and the at least one detector and configured to receive the detector electrical signal and determine the change in the pressure applied at the touch event location. In some embodiments, the optical touch sensor further comprises the light source being wavelength modulated to form intensity modulated light at the detector. In some embodiments, the detector electrical signal is processed by the controller to determine a modulation contrast representative of the change in pressure applied at the touch event location.

In some embodiments, the optical touch system further comprises a transparent sheet and wherein the transparent sheet is substantially transparent to infrared (IR) light, wherein the emitted light from the at least one light sources comprises IR light, and wherein the at least one detector is configured to detect the IR light.

In some embodiments, the capacitive touch sensor comprises a projected capacitance sensor. In some embodiments, the pCap sensor comprises a mutual capacitive sensor. In some embodiments, the device further comprises a display unit having a display, with the optical touch sensor operably arranged adjacent the display. In some embodiments, the capacitive sensor is arranged between the display unit and optical touch sensor.

An aspect of the disclosure comprises a method of operating a hybrid touch system as described herein. The method includes detecting the x- and y-position of one or more touch events on a touch surface via a capacitive touch sensor; resolving the x- and y-position of one or more touch events via a capacitive touch sensor; detecting the pressure on the touch surface of one or more touch events via an optical touch sensor; and resolving the pressure on the touch surface of one or more touch events via the optical touch sensor.

An aspect of the disclosure comprises a method of operating the hybrid touch system as disclosed herein. The method includes detecting a touch event on a touch surface via an optical touch sensor; determining whether the touch event is detected by a capacitive touch sensor that is operably arranged relative to the optical touch sensor; if the touch event is detected by the capacitive touch sensor, then resolving the x- and y-location of the touch event via a capacitive touch sensor; if the touch event is not detected by the capacitive touch sensor, then resolving the x- and y-location of the touch event via the optical touch sensor; and resolving the pressure on the touch surface of one or more touch events via the optical touch sensor.

Additional features and advantages of the disclosure are set forth in the detailed description that follows, and in part will be readily apparent to those skilled in the art from that description or recognized by practicing the disclosure as described herein, including the detailed description that follows, the claims, and the appended drawings.

The claims as well as the Abstract are incorporated into and constitute part of the Detailed Description set forth below.

All publications, articles, patents, published patent applications and the like cited herein are incorporated by reference herein in their entirety, including U.S. Patent Application Publication No. 2011/0122091 and U.S. Provisional Patent Applications No. 61/564,003 and 61/564,024.

BRIEF DESCRIPTION OF THE DRAWINGS

FIGS. 8A and 8B are schematic representations of a finger (FIG. 8A) and an eraser (FIG. 8B) from photographs taken below the transparent substrate, with the representations showing the contact area of the finger and eraser with increasing amounts of pressure P being applied to a transparent sheet.

Figure 1:
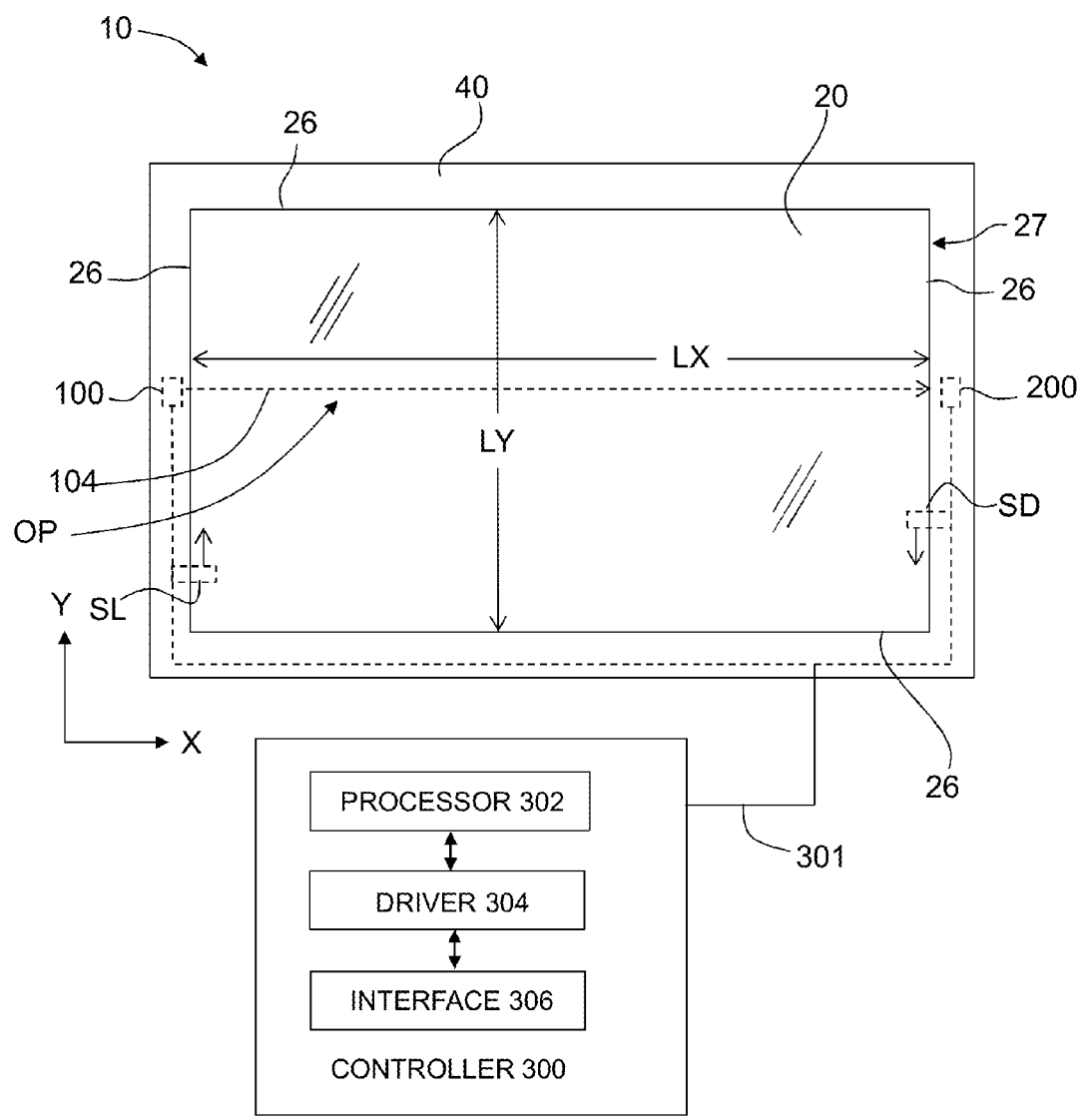
FIG. 1 is a face-on view of an example optical touch system according to the disclosure that is adapted for pressure sensing.

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements. Moreover, unless otherwise defined, all technical and scientific terms used herein have the same meaning as commonly understood by one of ordinary skill in the art to which this invention belongs. In case of conflict, the present specification, including the definitions herein, will control.

Although other methods and can be used in the practice or testing of the invention, certain suitable methods and materials are described herein.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Moreover, where a range of numerical values is recited herein, comprising upper and lower values, unless otherwise stated in specific circumstances, the range is intended to include the endpoints thereof, and all integers and fractions within the range. It is not intended that the scope of the invention be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B". Exclusive "or" is designated herein by terms such as "either A or B" and "one of A or B", for example.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the claimed invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is noted that one or more of the claims may utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

As used herein, the terms "sensor," "device," "system," "interface," "apparatus," may all be used interchangeably and may refer to part or all of an embodiment herein.

Touch interfaces are ubiquitous in many consumer electronic devices. It is often expected that one can approach a display and touch it in order to interact with it. Projected capacitive (pCap) touch sensing is the most commonly used method to sense finger (x- and y-location or in-plane) location on a screen, and relies on having electrodes sensing change in the electrical field.

While capacitive touch is the dominant touch-sensing method currently, it suffers from a number of difficulties. For example, capacitive touch sensing does not measure pressure directly, and, further, depends solely on the geometry and material of bodies in space. Thus, whether a finger is hovering just above the surface, barely touching it, or pressing hard on it, cannot be directly measured via a capacitive touch sensor. Further, pCap sensing is known to not be a robust and stable method for measuring finger pressure. This is mainly because pCap is working on larger scales than the changes seen in fingers as a result of pressure and its sensitivity is affected differently by various materials.

Optical touch sensing is one alternative method for touch-sensing based on coupling light out of the cover-glass into the finger. U.S. provisional applications 61/564,024 and 61/564,003, herein incorporated by reference in their entirety, describe the embodiments and methods that enable sensing x- and y-location of a touch (finger or other contact device) via total internal reflection-based optical touch sensing. The inclusion of alternative touch sensing technologies, such as optical touch sensing, into capacitive-based sensing technologies can overcome many of the limitations and challenges that are now seen with touch devices and displays and add new ways for people to interact with electronic devices. For example, blood-flow in the finger and wetting of the contact area, or the collapse of the fingerprint ridges (scale of ~350 µm width and ~100 µm depth), have significant impact on optical sensing, but not on capacitive sensing and can be used to determine the force being applied to a touch surface.

Capacitive Touch Technology

Capacitive (touch) sensors are used in many devices such as laptop trackpads, digital audio players, computer displays, mobile phones, mobile devices, and tablets. In capacitive touch sensors, the touch panel is coated with a material that stores electrical charge. When the panel is touched, a small amount of charge is drawn to the point of contact. Circuits located at each corner of the panel measure the charge and send the information to the controller for processing.

Capacitive sensors can be constructed from a variety of materials, including, but not limited to copper, Indium tin oxide (ITO) and printed ink. Copper capacitive sensors can be implemented on standard FR4 PCBs as well as on flexible material. ITO allows the capacitive sensor to be up to 90% transparent.

Size and spacing of the capacitive sensor are both very important to the sensor's performance. In addition to the size of the sensor, and its spacing relative to the ground plane, the type of ground plane used is very important.

In surface capacitance, only one side of the insulator is coated with conductive material. A small voltage is applied to this layer, resulting in a uniform electrostatic field. When a conductor, such as a human finger, touches the uncoated surface, a capacitor is dynamically formed. Due to the sheet resistance of the surface, each corner is measured to have a different effective capacitance. The sensor's controller can determine the location of the touch indirectly from the change in the capacitance as measured from the four corners of the panel: the larger the change in capacitance, the closer the touch is to that corner. With no moving parts, it is moderately durable, but has low resolution, is prone to false signals from parasitic capacitive coupling, and needs calibration during manufacture.

Alternatively, in projected capacitive touch (pCap) technology the conductive layers are etched in an X-Y grid to form a grid pattern of electrodes, or by etching two separate, perpendicular layers of conductive material with parallel lines or tracks to form the grid; comparable to the pixel grid found in many liquid crystal displays (LCD).

The greater resolution of pCap allows operation with no direct contact, such that the conducting layers can be coated with further protective insulating layers, and operate even under screen protectors, or behind weather and vandal-proof glass. Due to the top layer of a pCap being glass, pCap is a more robust solution versus resistive touch technology. Depending on the implementation, an active or passive stylus can be used instead of or in addition to a finger. This is common with point of sale devices that require signature capture. Gloved fingers may be sensed, depending on the implementation and gain settings, but are generally difficult for pCap to see. Conductive smudges and similar interference on the panel surface can interfere with the performance. Such conductive smudges come mostly from sticky or sweaty finger tips, especially in high humidity environments. Collected dust, which adheres to the screen due to the moisture from fingertips can also be a problem.

There are two types of pCap: self-capacitance, and mutual capacitance. Mutual capacitive sensors have a capacitor at each intersection of each row and each column. A 12-by-16 array, for example, would have 192 independent capacitors. A voltage is applied to the rows or columns. Bringing a finger or conductive stylus near the surface of the sensor changes the local electric field which reduces the mutual capacitance. The capacitance change at every individual point on the grid can be measured to accurately determine the touch location by measuring the voltage in the other axis. Mutual capacitance allows multi-touch operation where multiple fingers, palms or styli can be accurately tracked at the same time.

Self-capacitance sensors can have the same X-Y grid as mutual capacitance sensors, but the columns and rows operate independently. With self-capacitance, current senses the capacitive load of a finger on each column or row. This produces a stronger signal than mutual capacitance sensing, but it is unable to resolve accurately more than one finger, which results in "ghosting", or misplaced location sensing The capacitance in pCap devices is typically measured indirectly, by using it to control the frequency of an oscillator, or to vary the level of coupling (or attenuation) of an AC signal. The design of a simple capacitance meter is often based on a relaxation oscillator. The capacitance to be sensed forms a portion of the oscillator's RC circuit or LC circuit. Basically, the technique works by charging the unknown capacitance with a known current. (The equation of state for a capacitor is $i=C\ dv/dt$. This means that the capacitance equals the current divided by the rate of change of voltage across the capacitor.) The capacitance can be calculated by measuring the charging time required to reach the threshold voltage (of the relaxation oscillator), or equivalently, by measuring the oscillator's frequency. Both of these are proportional to the RC (or LC) time constant of the oscillator circuit.

The primary source of error in capacitance measurements is stray capacitance, which if not guarded against, may fluctuate between roughly 10 pF and 10 nF. The stray capacitance can be held relatively constant by shielding the (high impedance) capacitance signal and then connecting the shield to (a low impedance) ground reference. Also, to minimize the unwanted effects of stray capacitance, it is good practice to locate the sensing electronics as near the sensor electrodes as possible.

Another measurement technique is to apply a fixed-frequency AC-voltage signal across a capacitive divider. This consists of two capacitors in series, one of a known value and the other of an unknown value. An output signal is then taken from across one of the capacitors. The value of the unknown capacitor can be found from the ratio of capacitances, which equals the ratio of the output/input signal amplitudes, as could be measured by an AC voltmeter. More accurate instruments may use a capacitance bridge configuration, similar to a wheatstone bridge. The capacitance bridge helps to compensate for any variability that may exist in the applied signal.

In addition to single touch locations, capacitive touch devices as used herein further comprises those devices which are able to determine location of more than one touch simultaneously. In some embodiments, capacitive touch technologies may be able to determine the location of 2, 3, 4, 5, 6, 7, 8, 9, or 10 touches simultaneously. In some embodiments, capacitive touch technologies may be able to determine multiple touches that are static, dynamic, or combinations thereof.

Capacitive touch, capacitive sensing, and related terms, and determination of touch location, as used herein, may be further described by the following patents and applications, which are hereby incorporated by reference in their entirety: U.S. Pat. Nos. 3,333,160, 3,541,541, 3,662,105, 3,798,370, 4,246,452, 4,550,221, 4,672,364, 4,672,558, 4,692,809, 4,695,827, 4,733,222, 4,734,685, 4,746,770, 4,771,276, 4,788,384, 4,806,846, 4,898,555, 4,914,624, 4,968,877, 5,003,519, 5,017,030, 5,178,477, 5,189,403, 5,194,862, 5,224,861, 5,241,308, 5,252,951, 5,281,966, 5,305,017, 5,345,543, 5,376,948, 5,398,310, 5,442,742, 5,463,388, 5,463,696, 5,483,261, 5,488,204, 5,495,077, 5,513,309, 5,523,775, 5,530,455, 5,543,590, 5,543,591, 5,563,632, 5,563,996, 5,565,658, 5,579,036, 5,581,681, 5,583,946, 5,589,856, 5,590,219, 5,592,566, 5,594,810, 5,596,694, 5,612,719, 5,631,805, 5,633,955, 5,634,102, 5,636,101, 5,642,108, 5,644,657, 5,650,597, 5,666,113, 5,666,502, 5,666,552, 5,675,361, 5,677,710, 5,689,253, 5,710,844, 5,729,250, 5,730,165, 5,736,976, 5,741,990, 5,745,116, 5,745,716, 5,746,818, 5,748,269, 5,764,222, 5,767,457, 5,767,842, 5,790,104, 5,790,107, 5,802,516, 5,808,567, 5,809,267, 5,821,690, 5,821,930, 5,823,782, 5,825,351, 5,825,352, 5,854,625, 5,880,411, 5,898,434, 5,920,309, 5,923,319, 5,933,134, 5,942,733, 5,943,044, 6,002,389, 6,002,808, 6,020,881, 6,031,524, 6,037,882, 6,050,825, 6,052,339, 6,061,177, 6,072,494, 6,084,576, 6,107,997, 6,128,003, 6,131,299, 6,135,958, 6,144,380, 6,188,391, 6,198,515, 6,208,329, 6,222,465, 6,239,790, 6,243,071, 6,246,862, 6,249,606, 6,288,707, 6,289,326, 6,292,178, 6,323,846, 6,337,678, 6,347,290, 6,373,265, 6,377,009, 6,380,931, 6,411,287, 6,414,671, 6,421,234, 6,452,514, 6,457,355, 6,466,036, 6,515,669, 6,525,749, 6,535,200, 6,543,684, 6,543,947, 6,570,557, 6,593,916, 6,610,936, 6,624,833, 6,639,577, 6,650,319, 6,658,994, 6,670,894, 6,677,932, 6,677,934, 6,723,929, 6,724,366, 6,757,002, 6,803,906, 6,842,672, 6,856,259, 6,888,536, 6,900,795, 6,927,761, 6,942,571, 6,965,375, 6,972,401, 6,977,666, 6,985,801, 6,992,659, 7,030,860, 7,031,228, 7,208,259, 7,663,607, 7,966,578, 8,174,510, 8,168,908, 8,279,201, 8,279,189, 8,279,180, 8,279,176, 8,274,492, 8,274,488, 8,266,529, 8,260,378, 8,258,986, RE43,606, 8,255,830, 8,255,003, 8,253,706, 8,253,701, 8,253,700, 8,250,724, 8,249,661, 8,248,381, 8,248,380, 8,248,379, 8,248,378, 8,248,377, 8,243,030, 8,243,029, 8,239,784, 8,237,680, 8,237,679, 8,237,677, 8,237,675, 8,237,674, 8,237,673, 8,237,672, 8,237,671, 8,237,670, 8,237,669, 8,237,668, 8,237,667, 8,237,456, 8,235,460, 8,232,970, 8,228,308, 8,228,305, 8,223,133, 8,217,915, 8,217,913, 8,209,630, 8,206,047, 8,201,109, 8,199,127, 8,199,123, U.S. pat. Publ. Nos. 2002/0015024, 2002/0118848, 2003/0006974, 2003/0076301, 2003/0076303, 2003/0076306, 2003/0095095, 2003/0095096, 2003/0098858, 2003/0206202, 2003/0234768, 2003/0234770, 2004/0227736, 2004/0263484, 2005/0007349, 2005/0012723, 2005/0052425, 2005/0083307, 2005/0104867, 2005/0110768, 2005/0146511, 2006/0022955, 2006/0022956, 2006/0026521, 2006/0026535, 2006/0026536, 2006/0032680, 2006/0033724, 2006/0053387, 2006/0066582, 2006/0085757, 2006/0097991, 2006/0197753, and 2010/0001973.

The terms "capacitive sensor" and "capacitive touch sensor" are used hereinbelow to generally describe a capacitance-based touch system.

Optical Touch System for Pressure Sensing

FIG. 1 is a schematic diagram of an example pressure-sensing optics-based touch system ("optical touch system") 10 according to the disclosure. The optical touch system 10 may be used in a variety of consumer electronic articles, for example, in conjunction with displays for cell-phones, keyboards, touch screens and other electronic devices such as those capable of wireless communication, music players, notebook computers, mobile devices, game controllers, computer "mice," electronic book readers and the like. Optical touch system 10 constitutes an "optical touch sensor."

The example optical touch system 10 of FIG. 1 includes a transparent sheet 20, with at least one light source 100 and at least one detector 200 disposed adjacent the transparent sheet perimeter as discussed below. One light source 100 and one detector 200 are shown by way of example, with an example light beam (light) 104 from the light source shown traveling over a total-internal reflection (TIR) optical path OP from the light source to the detector. The travel of multiple light beams 104 within transparent sheet 20 as well as in additional waveguides operably arranged on the transparent sheet is discussed in greater detail below.

Optical touch system 10 is also referred to as an "optical touch sensor." Because optical touch system can detect an amount of applied pressure at a touch location, it can also be referred to as a "pressure-sensing touch system."

Multiple light-sources 100 can be used (or equivalently, a light source with multiple light-source elements can be used), and multiple detectors 200 can be used (or equivalently, a detector with multiple detector elements, especially when the location of one or more touch events needs to be determined. In addition, one or more light sources 100 and one or more detectors 200 can be operably disposed to ensure that the entire (or substantially the entire) transparent sheet can be used to sense the pressure of a touch event. This may include, for example, cycling the activation of sets (e.g., pairs) of light sources 100 and detectors 200 to ensure that all possible locations for touch events are covered. In an example, the cycling can be done at a rate that is much faster than the typical duration of a touch event that applies pressure to elicit a response from pressure-sensing optical touch system 10.

In an alternative example, only a portion of transparent sheet 20 is used to sense a touch event because the travel of light 104 within the transparent sheet body 21 is limited in extent. In such a case, the transparent sheet 20 can include indicia (not shown) directing a user to locate the touch event within a select area where pressure associated with a touch event can be detected.

Light sources 100 and detectors 200 can be coupled directly to the transparent sheet from the edge or bottom as discussed below. Alternatively, light sources 100 and detectors 100 can be optical coupled to transparent sheet 20 using optical means, such as lenses, prisms, gratings, etc., to achieve a desired distribution of light 104 to travel within the transparent sheet. The use of optical means to facilitate optical coupling can be used to increase or optimize the coupling efficiency and increase performance of pressure-sensing optical touch system 10.

Example detectors 200 include photodiodes and the various types of photosensors. Example light sources 100 include LEDs, laser diodes, optical-fiber-based lasers, extended light sources, and the like.

In example embodiments of the disclosure, an amount of pressure (e.g., a relative amount of pressure) associated with a touch event TE is sensed without regard to the touch event location where the pressure is being applied. Aspects of the disclosure include combining the pressure-sensing ability of optical touch system 10 disclosed herein with conventional positional-sensing touch systems, which allows for determining both the location of a touch event and an amount of pressure associated with the touch event. Other aspects of the disclosure include making absolute pressure measurements using force-sensing devices, as described below. Other embodiments include providing means for determining multiple touch-event locations, such as the use of an array of waveguides rather than just a single waveguide. Such embodiments are set forth below.

Figure 15A:
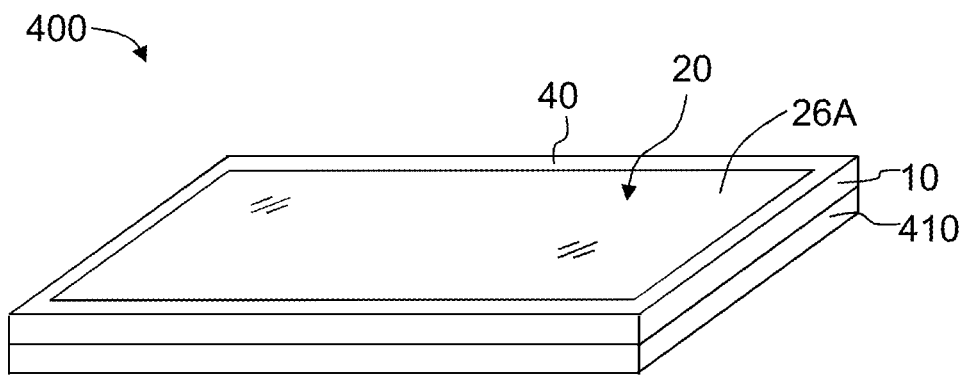
FIGS. 15A through 15D illustrate an example embodiment of a hybrid touch system that utilizes the pressure-sensing optical touch system interfaced with a capacitive sensor that can distinguish touch position in the x- and y-directions (in-glass-plane directions).
Figure 15B:
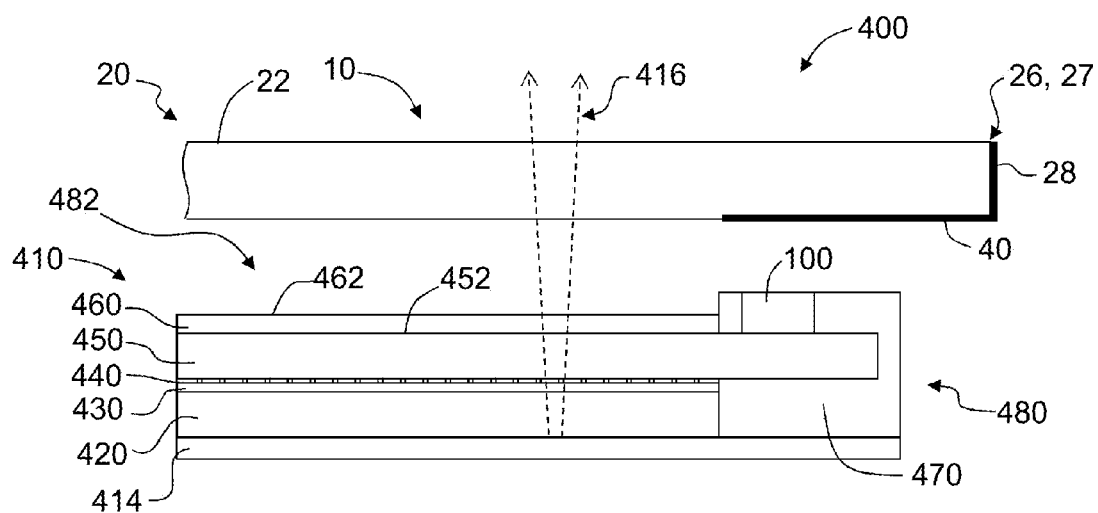
Figure 15C:
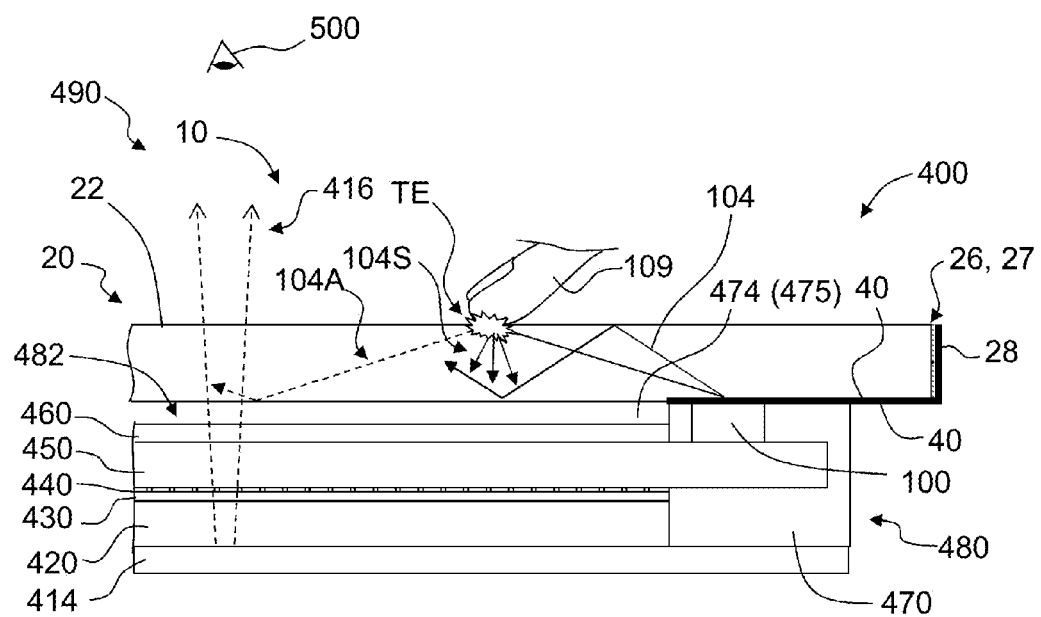

In an example, optical touch system 10 includes an optional cover 40 that serves to cover light source 100 and 200 so that they cannot be seen from above (i.e., through top surface 22) by a viewer (see, e.g., viewer 500, FIG. 15C). In an example, cover 40 serves the role of a bezel. In an example, cover 40 can be any type of light-blocking member, film, paint, glass, component, material, texture, structure, etc., that serves to block at least visible light and that is configured to keep some portion of pressure-sensing optical touch system 10 from being viewed by a user, or that blocks one wavelength of light while transmitting another.

In example embodiments discussed below (see e.g., FIG. 4C), cover 40 can reside anywhere relative to transparent sheet 20 (e.g., bottom surface 24, as introduced and discussed below) that serves to block a viewer from seeing light source 100 or detector 200. Cover 40 need not be contiguous and can be made of sections or segments. Further, cover 40 can be used to shield detector 200 from receiving light other than light 104 from light source 100, such as for sunlight rejection. Thus, in an example, cover can be substantially opaque at one wavelength (e.g., a visible wavelength) and substantially transparent at another wavelength (e.g., an infrared wavelength for light 104 from light source 100).

With continuing reference to FIG. 1, optical touch system 10 includes a controller 300 that is operably connected (e.g., via a bus 301) to the one or more light sources 100 and the one or more detectors 200. Controller 300 is configured to control the operation of optical touch system 10. The controller 300 includes a processor 302, a device driver 304 and interface circuit 306, all operably arranged.

In an example, controller 300 is or includes a computer and includes a device, for example, a floppy disk drive, CD-ROM drive, DVD drive, magnetic optical disk (MOD) device (not shown), or any other digital device including a network connecting device such as an Ethernet device (not shown) for reading instructions and/or data from a computer-readable medium, such as a floppy disk, a CD-ROM, a DVD, a MOD or another digital source such as a network or the Internet, as well as yet to be developed digital means. The computer executes instructions stored in firmware (not shown).

The computer is programmable to perform functions described herein, including the operation of the pressure-sensing touch system and any signal processing that is required to measure, for example, relative amounts of pressure, as well as the location of a touch event, or multiple touch events and multiple pressures. As used herein, the term computer is not limited to just those integrated circuits referred to in the art as computers, but broadly refers to computers, processors, microcontrollers, microcomputers, programmable logic controllers, application-specific integrated circuits, and other programmable circuits, and these terms are used interchangeably herein.

Software may implement or aid in performing the pressure-sensing functions and operations disclosed herein. The software may be operably installed in controller 300 or processor 302. Software functionalities may involve programming, including executable code, and such functionalities may be used to implement the methods disclosed herein. Such software code is executable by the general-purpose computer or by the processor unit described below.

In operation, the code and possibly the associated data records are stored within a general-purpose computer platform, within the processor unit, or in local memory. At other times, however, the software may be stored at other locations and/or transported for loading into the appropriate general-purpose computer systems. Hence, the embodiments discussed herein involve one or more software products in the form of one or more modules of code carried by at least one machine-readable medium. Execution of such code by a processor of the computer system or by the processor unit enables the platform to implement the catalog and/or software downloading functions, in essentially the manner performed in the embodiments discussed and illustrated herein.

The computer and/or processor as discussed below may each employ a computer-readable medium or machine-readable medium, which refers to any medium that participates in providing instructions to a processor for execution, including for example, determining an amount of pressure associated with a touch event, as explained below. Any memory discussed below constitutes a computer-readable medium. Such a medium may take many forms, including but not limited to, non-volatile media, volatile media, and transmission media. Non-volatile media include, for example, optical or magnetic disks, such as any of the storage devices in any computer(s) operating as one of the server platforms, discussed above. Volatile media include dynamic memory, such as main memory of such a computer platform. Physical transmission media include coaxial cables; copper wire and fiber optics, including the wires that comprise a bus within a computer system.

Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 2:
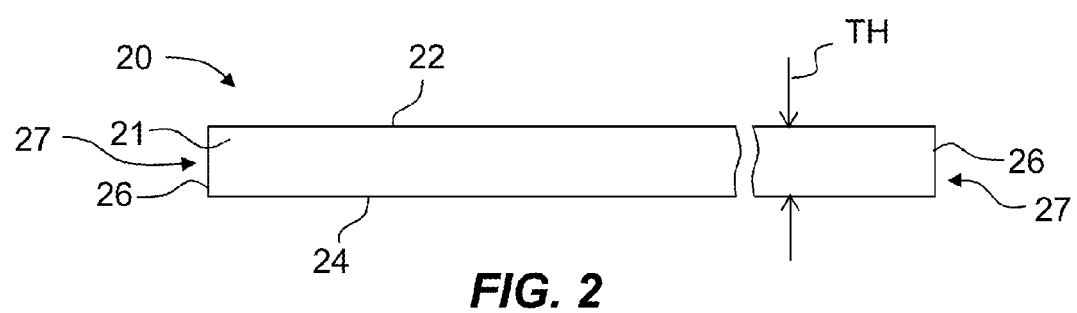
FIG. 2 is a cross-sectional view of the transparent sheet of the pressure-sensing optical touch system.

FIG. 2 is a cross-sectional view of transparent sheet 20. The transparent sheet 20 includes a bulk portion or body 21, a top or upper surface 22, a bottom or lower surface 24 and at least one edge 26 that defines a perimeter 27. An example transparent sheet 20 is generally rectangular and includes four edges 26, and this example of the transparent sheet is used in the discussion below by way of illustration. Other shapes for transparent sheet 20 may be used, such as circular. Moreover, transparent sheet 20 may be shaped to create a 3D shape in space. For example, it may have downwardly curved edges 26. Edges 26 can be beveled, rounded, tapered or have another shape. In an example, the shape of edge 26 is chosen to reduce or minimize the reflection of light 104 that travels internally within the sheet. In another example, the shape of edge 26 is chosen to increase or maximize the reflection of light 104 that travels internally within the sheet. Perimeter 27 may have any reasonable shape or configuration suitable for the particular application.

Generally, transparent sheet 20 can have any reasonable configuration that allows it to serve as a waveguide for light 104, while also being able to provide a place where a user can apply pressure to elicit a response from pressure-sensing optical touch system 10. In an example, top surface 22 defines a touch surface.

With reference again also to FIG. 1, transparent sheet 20 has a thickness TH, which is substantially uniform (i.e., top and bottom surfaces 22 and 24 are substantially parallel). In an example, transparent sheet 20 is rectangular and has a dimension (length) LX in the X-direction and a length LY in the Y-direction, and so has four corners defined by four edges 26. Generally, transparent sheet 20 can have a shape wherein edges 26 define multiple corners.

The transparent sheet 20 may generally be made of any suitably transparent material that can be formed into a thin planar sheet, such as plastic, acrylic, glass, etc., and that supports the transmission of light 104 within its body 21 without substantial loss due to scattering or absorption. In an example embodiment, transparent sheet 20 has a thickness TH that allows it to flex without breaking when pressure is locally applied at top surface 22. In another embodiment, the thickness TH is selected to that transparent sheet 20 does not substantially flex when pressure is locally applied at top surface 22. An exemplary range of thickness TH for transparent sheet 20 is from 50 microns to 5 mm. Other thickness can be employed consistent with the particular application for pressure-sensing optical touch system 10.

In an example embodiment, transparent sheet 20 may be a chemically strengthened glass, such as a soda-lime-type glass. An example glass for transparent sheet 20 is an alkali aluminosilicate glass hardened through ion exchange. These types of glass can comprise $Na_2O$ (soda), CaO (lime) and $SiO_2$ (silica), but can also include oxides such as MgO, $Li_2O$, $K_2O$, ZnO, and $ZrO_2$. Once hardened through ion exchange, these types of glass exhibit certain characteristics that make them desirable for touch screen applications, as well as other applications (e.g., as a cover glass). Further details as to the formulation or production, or both, of soda-lime-type glass suitable for use as transparent sheet 20 may be found in one or more of U.S. patent application Ser. No. 11/888,213 filed Jul. 31, 2007; U.S. patent application Ser. No. 12/537,393 filed Aug. 7, 2009; U.S. patent application Ser. No. 12/545,475 filed Aug. 21, 2009; and U.S. patent application Ser. No. 12/392,577 filed Feb. 25, 2009. An exemplary glass for transparent sheet 20 is Gorilla® glass, from Corning, Inc., Corning, N.Y. Also, an exemplary glass, such as low-iron Gorilla® glass or other low-iron ion-exchanged glass, is transparent to IR-wavelength light 104.

With reference again to FIG. 1, light source 100 is operably disposed adjacent perimeter 27 of transparent sheet 20. In an embodiment, light source emits light 104 at an IR wavelength, such as between 750 nm and 950 nm. In the discussion below, light 104 is also referred to as "light ray" 104 or "light rays" or "light beam" 104 or "light beams" 104 where appropriate.

Figure 3:
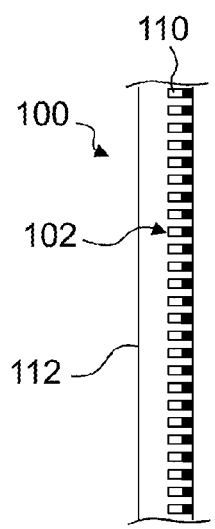
FIG. 3 is a top-down view of an example light source that includes multiple light-source elements.

With reference to FIG. 3, light source 100 can comprise one or more light-source elements 102 that operably mounted on flex-circuit boards ("flex circuits") 110, which in turn are mounted to printed circuit boards (PCB) 112 arranged adjacent an edge 26 of transparent sheet 20. In the discussion herein, light source 100 can thus mean a light source having one or more light-source elements 102. Likewise, detector 200 can include a detector that has one more detector elements (not shown).

In an embodiment, light source 100 is edge-coupled to transparent sheet 20 through edges 26 or through bottom surface 24. Edge coupling is discussed herein by way of example. In other embodiment discussed below, light source 100 and detector 200 are operably arranged at the same edge 26 or same surface 24 of transparent sheet 20.

In the general operation of optical touch system 10, processor 302 drives the activation of light-source 100 via a light-source signal SL and also controls the detection of light 104 at detector 200. Detector 200 generates a detector electrical signal SD in response to detecting light 104, wherein the strength of the signal SD is representative of the intensity of the detected light. Portions of interface circuit 306 can be placed near detector 200. For example, preamplifiers and analog-to-digital converters (not shown) may be placed near detector 200 to eliminate noise that may be induced in long wires between processor 302 and the detectors 200, particularly when the processor is centrally located.

In an example, processor 302 controls the light emission and detection process to optimize the detection of light 104, e.g., by providing a characteristic (e.g., a modulation) to the light 104 from the light-source elements 102, or by gating detectors 200 to reduce noise, etc., or both. The modulation may be wavelength modulation or intensity modulation.

Aspects of the disclosure include determining a relative amount of pressure that is applied to top surface 22 of transparent substrate 20 by a finger, stylus or like implement. In the discussion below, a finger and a stylus with a compressible end are used by way of non-limiting example to describe the pressure-sensing capabilities of optical touch system 10. Aspects of the disclosure include detecting respective pressures associated multiple touch events, such as when pressure-sensing optical touch system 10 is used in forming a pressure-sensing keyboard, as discussed below. It is noted here that the pressure applied to top surface 22 may be through another surface that resides atop surface 22, such as a coating layer 220, introduced and discussed below.

Figure 4A:
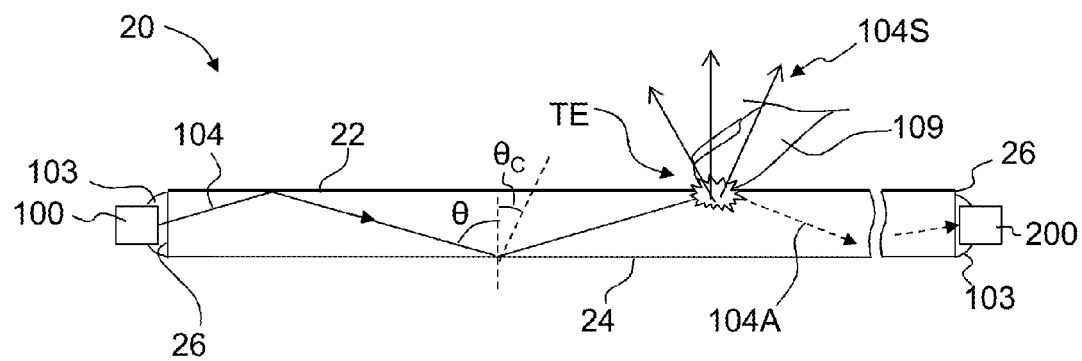
FIGS. 4A through 4C are close-up cross-sectional views of a portion of the pressure-sensing optical touch system of FIG. 1, illustrating different example embodiments of how the light source can be arranged relative to the transparent sheet to couple light into the transparent sheet, and how a touch event from a finger scatters light at the touch event location.

FIG. 4A is a close-up cross-sectional view of transparent sheet 20, showing an example of how light source 100 and detector 200 are optically coupled to the transparent sheet. In the example of FIG. 4A, light source 100 and detector 200 are edge-coupled to their respective edges 26 using, for example, a glue or adhesive 103, which in an example is index-matched to the transparent sheet to avoid or minimize reflections.

When light source 100 is activated, it emits light 104 (light rays) that travels into body 21 of transparent sheet 20 over a large number of optical paths. The portion of light 104 that has an angle beyond a critical internal reflection angle $\theta_C$ (see FIG. 5) of transparent sheet 20 remains trapped in transparent sheet body 21 via TIR and travels therein. If the travel of internally reflected light 104 remains uninterrupted, it will arrive at detector 200. Thus, transparent sheet 20 acts as an optical waveguide that supports a large number of guided modes, i.e., light rays 104 that travel within the transparent sheet over a wide range of an internal reflection angles $\theta$ beyond critical internal reflection angle $\theta_C$.

Detector 200 is configured to convert the detected light 104 in the aforementioned detector electrical SD, which in an example is a photocurrent. The detector electrical signal SD is then sent to processor 302 for processing, as described below. Such processing is used to extract information relating to changes in the applied pressure at top surface 22 of transparent sheet 20 associated with touch event TE.

Figure 4B:
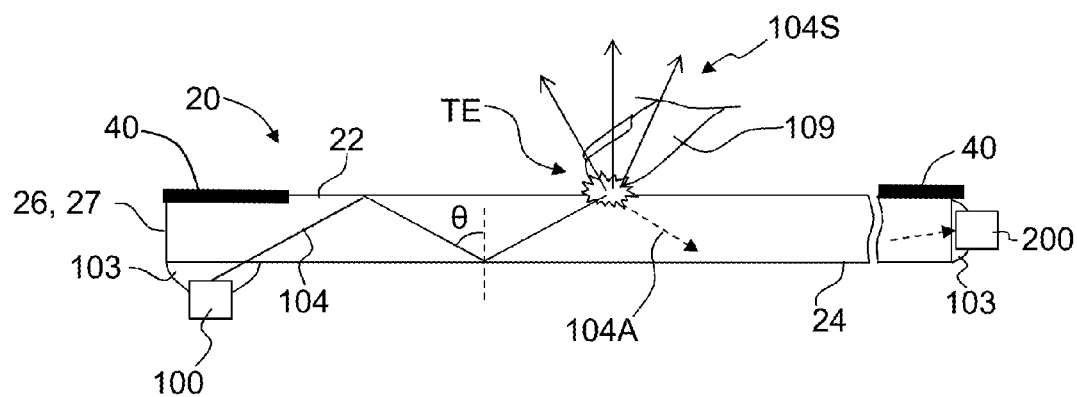

FIG. 4B is similar to FIG. 4A and illustrates an alternative embodiment wherein light source 100 is disposed adjacent bottom surface 24 of transparent sheet 20 and is optically coupled thereto. This face-coupling configuration offers several advantages over the edge-coupling configuration, including simpler manufacturing, no bezel requirement, and potentially increased touch sensitivity. When light 104 is launched into transparent sheet 20, multiple modes propagate at different bounce angles as discussed above in connection with the edge-coupling configuration. The edge-coupling configuration is more likely to generate modes at low bounce angles, while the surface-coupling configuration generates modes at higher bounce angles. Light rays 104 with higher bounce angles provide increased touch sensitivity because they strike top surface 22 more frequently, thereby providing a greater opportunity to interact with a touch event TE.

To keep light-source elements 102 from being seen through transparent sheet 20 by user 500 (see e.g., FIG. 15B), one or more of the aforementioned covers 40 can be employed. In an example, cover 40 is in the form of a film that is opaque at least at visible wavelengths and that optionally transmits at IR wavelengths. An example film for cover comprises a black paint that absorbs light over a wide range of wavelengths including the visible and IR wavelengths. In another example illustrated in FIG. 4C, cover can be disposed between light source 100 and bottom surface 24 of transparent sheet 20, in which case the bezel needs to be substantially transparent to the wavelength of the light-emitting element. In this case, a convenient wavelength of light 104 is an IR wavelength.

Modeling indicates that about 28% of light 104 outputted by light-source element 102 can be trapped within transparent sheet 20 using the face-coupling configuration of FIG. 4B, as compared to about 80% for the edge-coupling configuration of FIG. 4A.

Figure 4C:
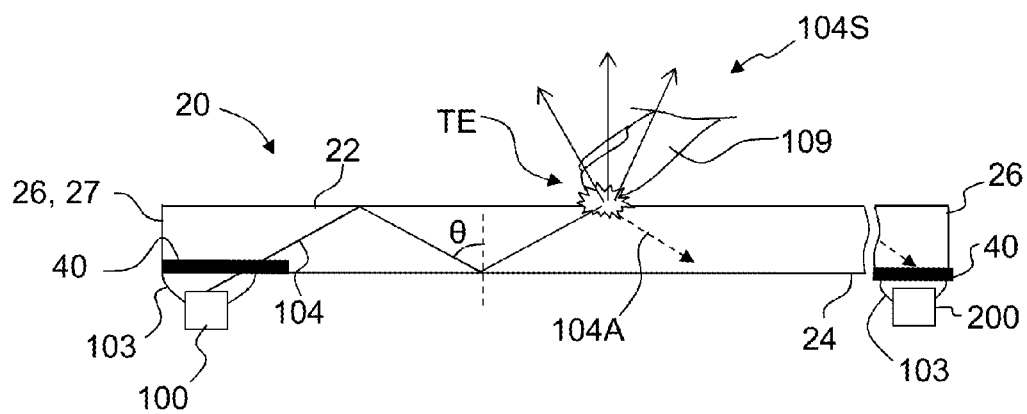

With continuing reference to FIGS. 4A, 4B and 4C, when a touch event TE occurs, such as when a person's finger 109 touches top surface 22 of transparent sheet 20, it changes the TIR condition of the waveguide as defined by transparent sheet body 21 and top and bottom surfaces 22 and 24. This causes light 104 to be scattered out of transparent sheet body 21 as scattered light 104S at the point (or more accurately, over the area of optical contact) where top surface 22 is touched, thereby attenuating light beam 104 to form an attenuated light beam 104A that continues propagating within body 21 of transparent sheet 20. The touching of top surface 22 is called a touch event TE by an implement such as finger 109 and its location is referred to herein as the touch-event location.

The intensity of attenuated light beam 104 arriving at detector 200 gives rise to a changed signal strength (e.g., a changed photocurrent) for detector electrical signal SD (as compared to, say, a baseline photocurrent measurement with the original light beam 104), and indicates that a touch event TE has occurred. A threshold value T for the measured detector electrical signal SD can be used to determine whether a touch event TE has occurred.

Figure 5:
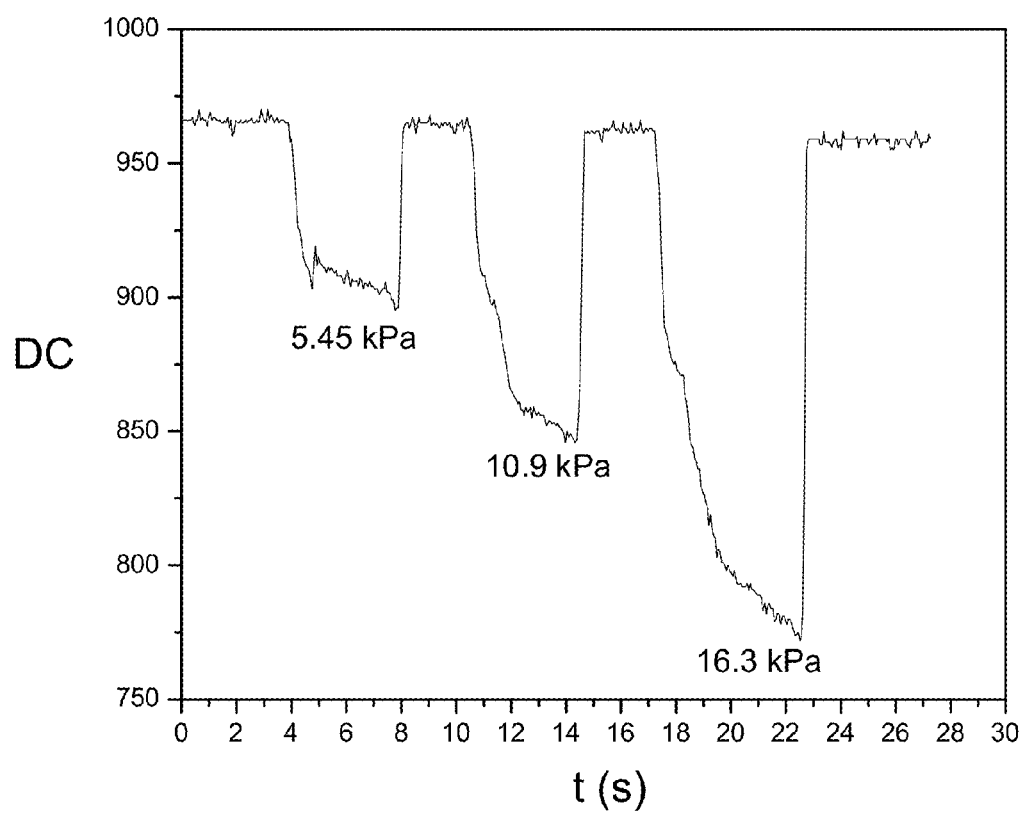
FIG. 5 is a plot of detector counts DC vs. time t (seconds, s) showing how touch events of different pressure cause a corresponding change in the detector counts and can be used to sense the relative pressure for a touch event.

An aspect of the present disclosure includes measuring an amount of attenuation in attenuated light beam 104 and correlating the measured attenuation to an amount of pressure that is associated with touch event TE. FIG. 5 is a plot of the number of counts DC vs. time t (seconds, s) for a configuration of pressure-sensing optical touch system 10 similar to that shown in FIG. 1, wherein an eraser was used as the implement for creating touch event TE. The eraser was pressed into top surface 22 with different forces and the resultant pressures (force/area) measured as a function of time. The eraser was lifted from the surface after each application of different pressure, i.e., touch event TE was repeated with different pressures.

As can be seen in FIG. 5, the detector counts DC at detector 200 show decreases that corresponds (correlates) to measured pressures of 5.45 kPa, 10.9 kPa and 16.3 kPa. Note that the baseline count returned to a relatively constant value between each touch event TE. Thus, the measured attenuation (as reflected, for example, as counts with an ADC detector) can be used as measure of the relative pressure being applied by a user when the user creates a touch event TE. When sensing pressure that arises from the touch of finger 109, the baseline count may change due to the transfer of oils, moisture, and salt from the finger to top surface 22. This change can be accounted for in software running in controller 300.

Pressure Sensing in Reflective Mode

Figure 6A:
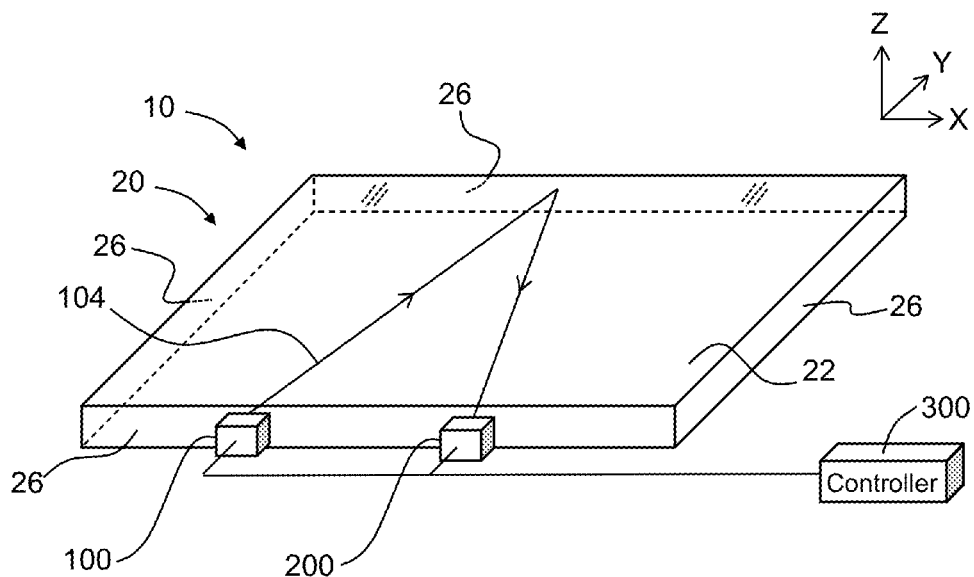
FIGS. 6A and 6B are elevated views of an example pressure-sensing optical touch system that works in a reflective mode.

FIG. 6A is an elevated view of an example optical touch system 10 that illustrates an example embodiment of performing pressure-sensing of touch event TE in a reflective mode. In the configuration of FIG. 6A, both light source 100 and detector 200 are operably arranged at the same side 26 of transparent sheet 20. Light source 100 emits light 104 over a wide range of angles in all directions and will internally reflect off of the other three sides 26 as well as the top and bottom 22 and 24 of transparent sheet 20. In an example, sides 26 and surfaces 22 and 24 are either polished, mirror-coated, or coated with high reflectivity material such that TIR light bounces multiple times, filling body 21 of transparent medium with light 104 traveling over a large number of optical paths. FIG. 6A illustrates one example light ray 104 that reflects from the far side 26 and is received by detector 200.

Figure 6B:
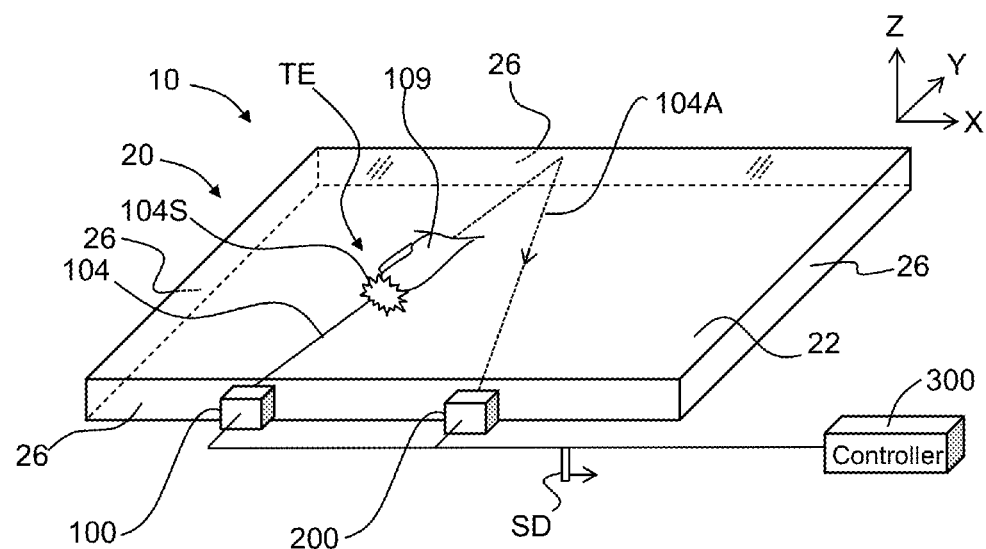

FIG. 6B shows the pressure-sensing optical touch system 10 of FIG. 1 but in a pressure-sensing state with finger 109 giving rise to a touch event TE. As described above, the guided light 104 is absorbed and scattered at the location on surface 22 of touch event TE as finger 109 comes into contact with the top surface. The signal SD as measured by detector 200 depends on the amount of pressure applied by finger 109, with the result of the touch being a decrease in photocurrent representative of the reduced intensity of attenuated light beam 104A as compared to the initial (unattenuated) light beam 104.

Pressure Sensing in Scatter Mode

Figure 7A:
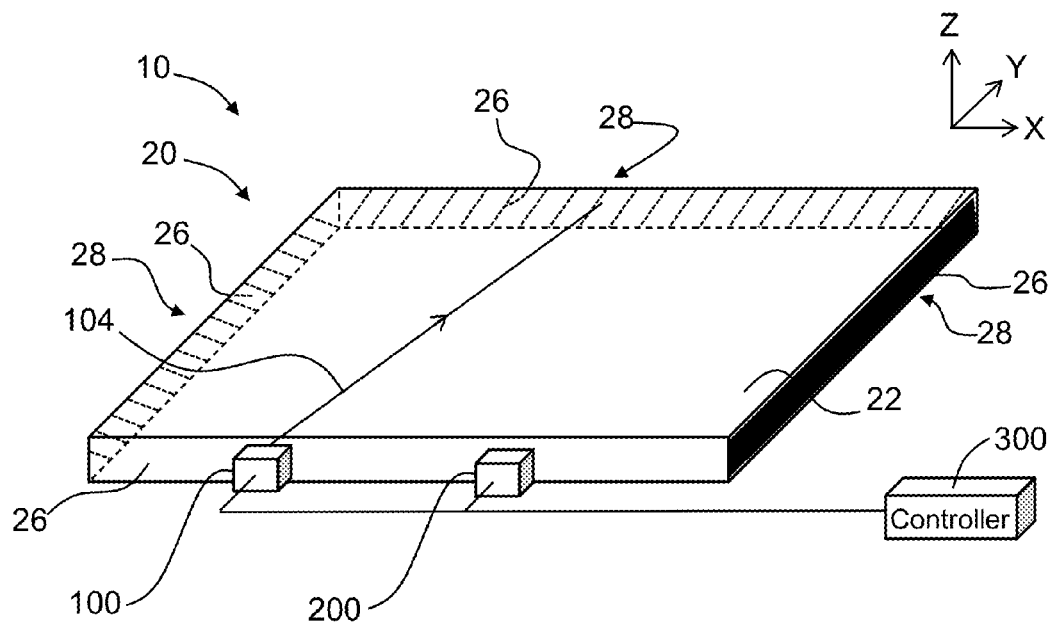
FIGS. 7A and 7B are elevated views of an example pressure-sensing optical touch system that works in a scattering mode.
Figure 7B:
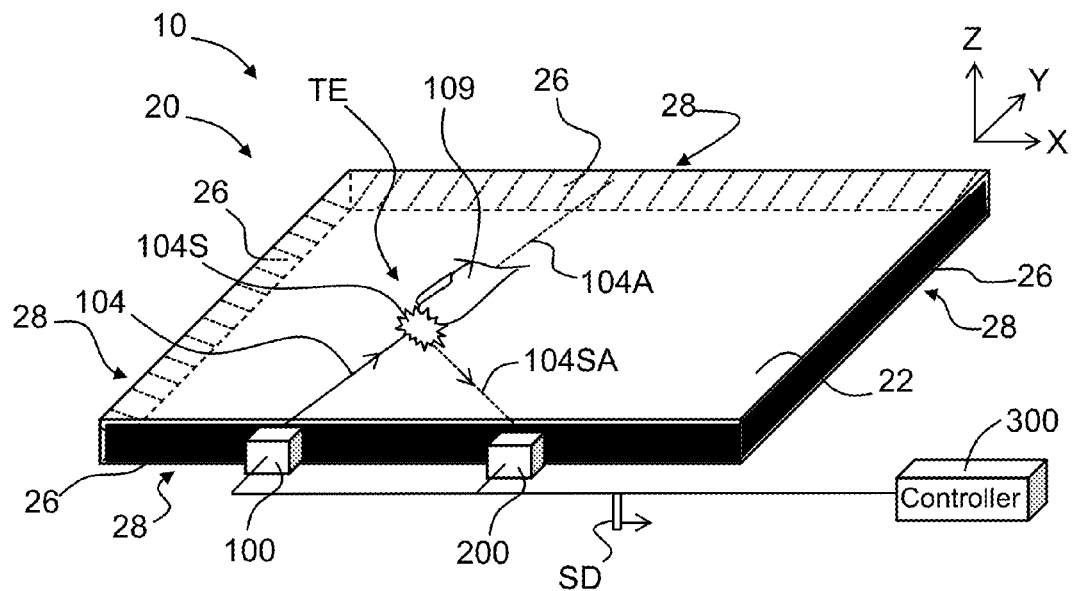

FIGS. 7A and 7B are similar to FIG. 6A and FIG. 6B and illustrate an example embodiment of optical touch system 10 wherein the pressure-sensing capability is provided by light scattering rather than by light reflection. With reference to FIG. 7A, sidewalls 26 are made to be substantially absorbing. The sidewalls 26 are shown as being coated with a light-absorbing material 28, except where light source 100 and detector 200 reside.

With reference to FIG. 7B, when a touch event TE occurs, some of the scattered light 104S is scattered toward detector 200 as scattered and attenuated light 104SA. The attenuated light 104A travels along the original path of light 104 and is incident upon sidewall 26, where it is absorbed by absorbing material 28 deposited thereon. In this case, as the pressure of finger 109 is increased at the location of touch event TE, the amount of scattered light increases, so that the strength of scattered attenuated light 104SA increases. Detector 200 then detects the scattered attenuated light 104SA. This increase in the applied pressure at touch event TE causes a corresponding increase in the amount of scattered attenuated light 104SA, which results in an increase in the photocurrent in the detector electrical signal SD. The detector electrical signal SD is then sent to controller 300 for processing to measure the amount of applied pressure at the location of touch event TE.

FIGS. 8A and 8B are schematic representations of finger 109 (FIG. 8A) and an eraser (FIG. 8B) from photographs taken below transparent substrate 20. FIGS. 8A and 8B show contact areas 113 for finger 109 and eraser 113 for increasing amounts of pressure P (as indicated by the upward arrow) being applied to a transparent sheet by the finger and the eraser. The size of the contact area 113 on transparent sheet top surface 22 increases as the applied pressure on the finger 109 or eraser 11 is increased.

Figure 8C:
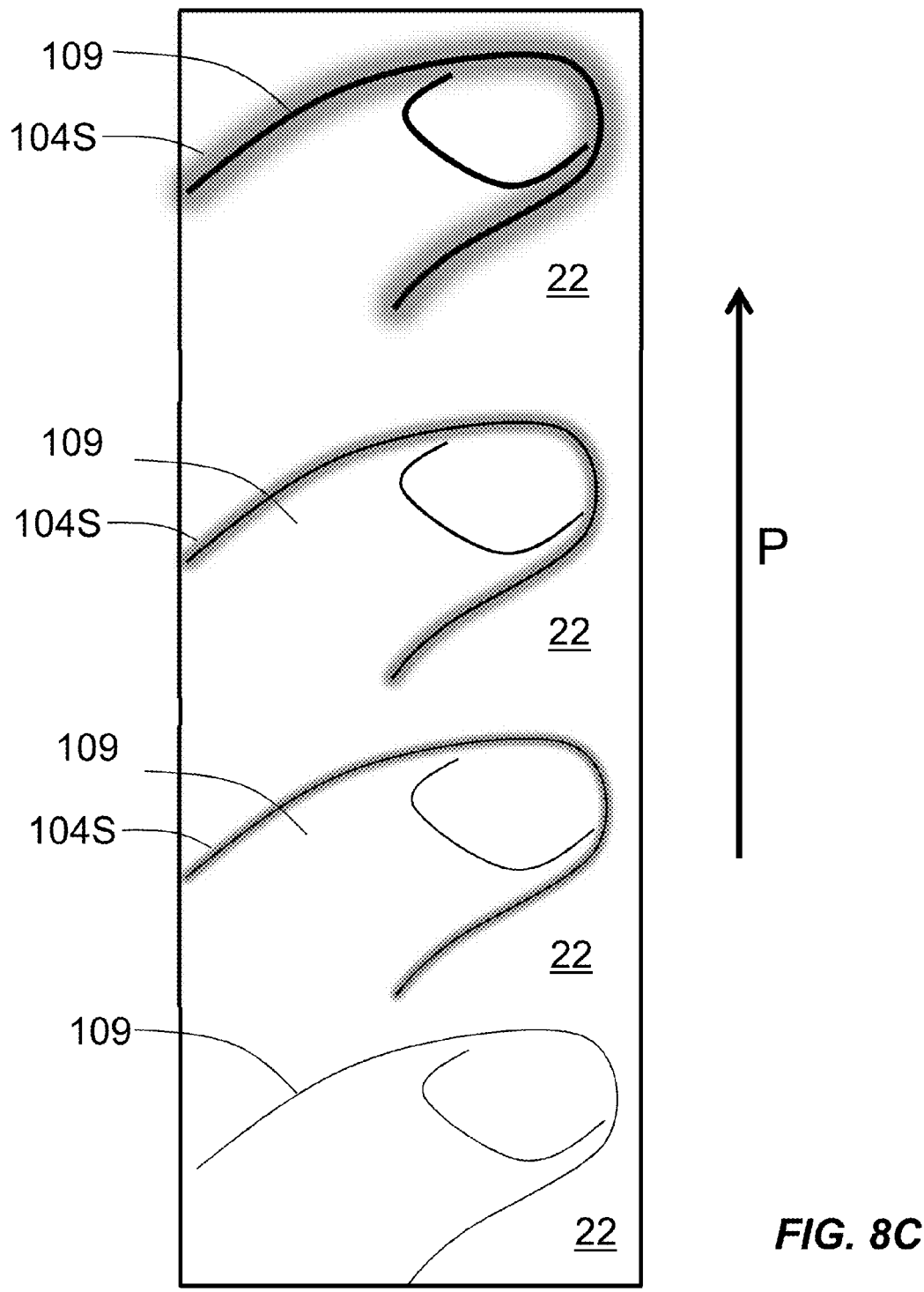
FIG. 8C is a series of schematic representations based on actual photographs of a finger being applied to the top surface of the transparent sheet of the pressure-sensing optical touch system, whereby increasing amounts of light scattering from the transparent sheet due to increasing the applied pressure make the finger more visible from above.

It is observed that increasing amounts of pressure result in an increase in the amount of scattered light 104S leaving the top surface 22 of the transparent sheet 20 at the touch location TL. The increase in the amount of scattering is due to the increase in the amount (area) of optical contact, which causes the light 104 traveling in the body 21 of the transparent sheet 20 to interact more and more strongly with the object being pressed into the top surface 22 of the transparent sheet. This is also illustrated in FIG. 8C, which shows a series of schematic representations based on actual photographs of finger 109 being applied to the top surface 22 of a transparent sheet 20 with increasing amounts of pressure P, as indicated by the upwards arrow. The increasing pressure P increases the amount of scattered light 104S (shown as a halo around the finger) that emanates from transparent sheet 20, which makes finger 109 more visible when viewed from above.

Figure 9A:
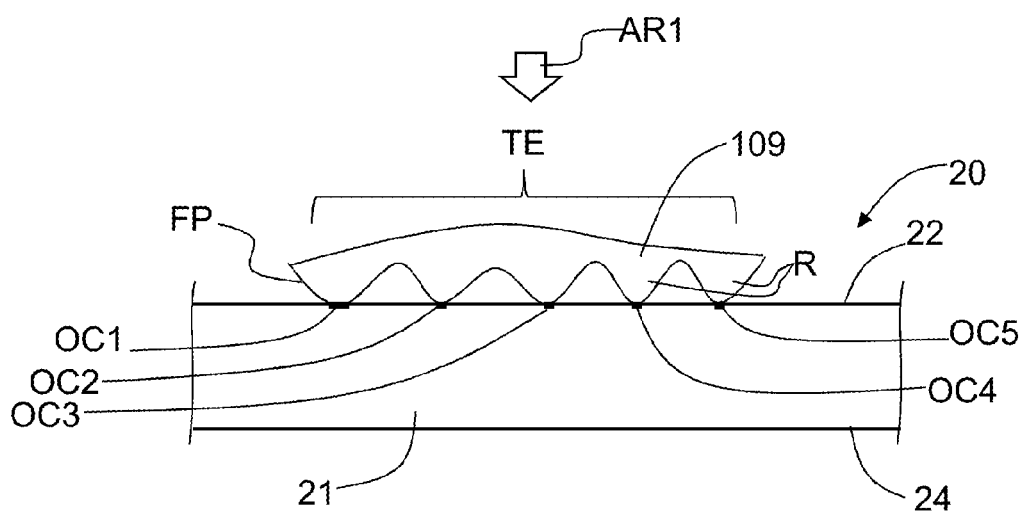
FIGS. 9A through 9C are schematic cross-sectional views of a finger being pressed down onto the top surface of the transparent sheet of the pressure-sensing optical touch system, showing the increasing amounts (areas) of optical contact that the finger makes with the transparent sheet as a function of increasing finger pressure.
Figure 9B:
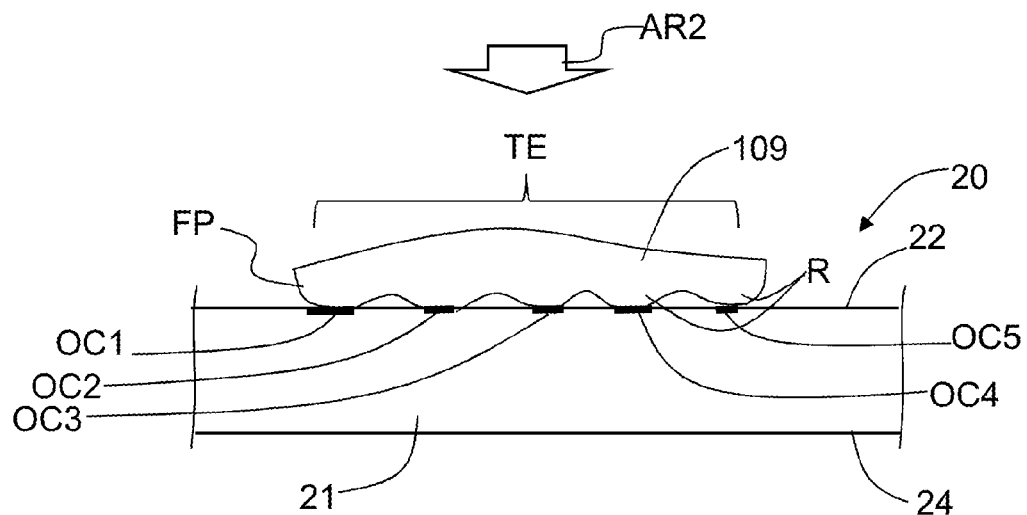
Figure 9C:
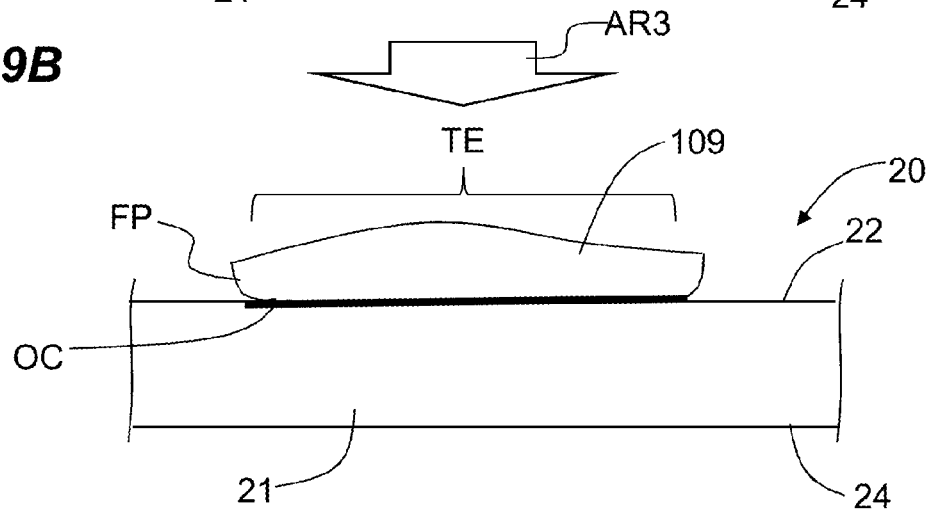

FIGS. 9A through 9C are schematic cross-sectional diagrams that illustrates the phenomenon observed in FIG. 8B. FIG. 9A shows a finger 109 with fingerprints FP at a touch event TE. For ease of illustration, light 104, scattered light 104S and attenuated light 104A are omitted.

In FIG. 9A, finger 109 is being pressed into top surface 22 of transparent sheet 20 with a first amount of force F1 as indicated by arrow AR1. The ridges R that define finger print FP make optical contact with surface 22 at a number of locations denoted OC1 through OC5. These optical contact locations each have a certain surface area associated with them that result in an amount of pressure on surface 22 as defined by the force F1 divided by the surface area associated with optical contact locations OC1 through OC5.

FIG. 9B is essentially the same as FIG. 9A but shows the case where the force of finger 109 is increases to a second amount of force F2 as indicated by arrow AR2. The additional force causes ridges R to flatten, which increase the amount of optical contact area at locations OC1 through OC5. This in turn results in more light being scattered out of body 21 of transparent sheet 20 at the location of touch event TE.

FIG. 9C shows a case where a third amount of force F3 as indicated by arrow AR3 is applied that is sufficiently great to substantially flatten out ridges R so that substantially the entire fingertip makes optical contact OC at the location of touch event TE. This serves to substantially increase the area of optical contact and generate even more scattered light 104S from body 21 of transparent sheet 20 at the touch location TL of touch event TE.

Surface Roughness

Figure 10:
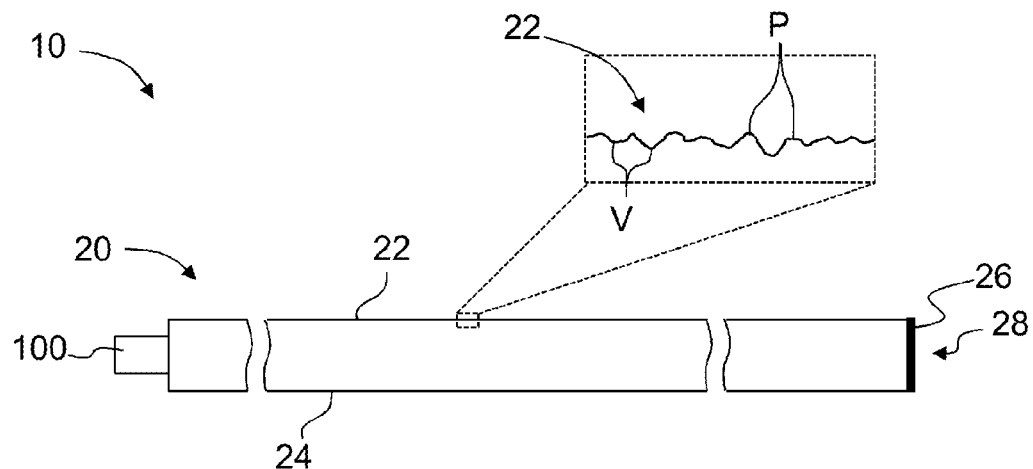
FIG. 10 is a close-up, cross-sectional view of a portion of an example pressure-sensing optical touch system, wherein the top surface of the transparent sheet is a rough surface.

In an example embodiment of optical touch system 10 is illustrated in FIG. 10, top surface 22 has an amount of surface roughness, as shown in the close-up inset. For example, if top surface 22 has peaks P and valleys V, the range of possible levels of optical coupling via optical contact with a finger or other element used to create a touch event TE can be enhanced. In an example, the scale of the surface roughness is roughly that of fingerprint, e.g., in the range from 100 microns to 300 microns. Here, the roughness scale can be the spacing between peaks and valleys or a root-mean-square (RMS) roughness. In another example, the roughness is between 100 nanometers and 1 mm. Top surface 22 can be provided with roughness using a variety of techniques, such as etching, mechanical polishing, embossing, coating with particles, and other known methods. The surface roughness can be random, quasi-random or periodic, nano-featured, micro-featured or textured.

Layered Surface

Figure 11:
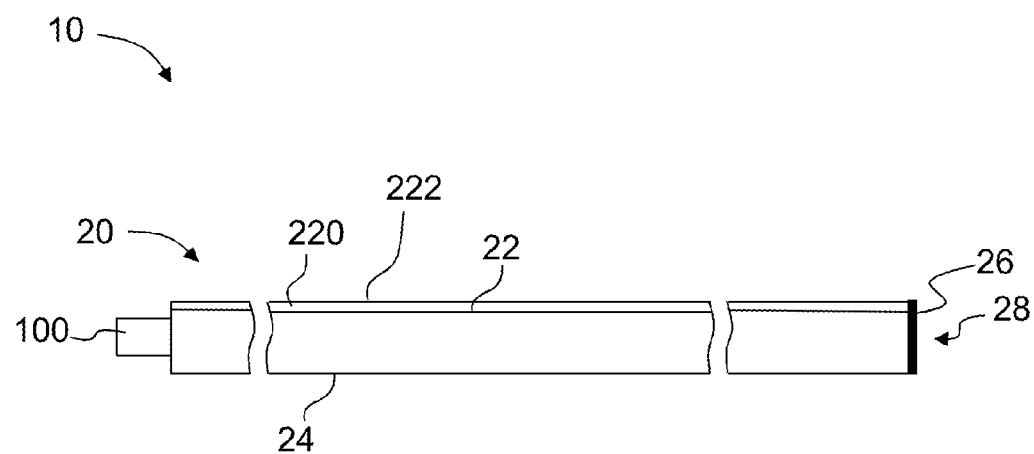
FIG. 11 is a close-up, cross-sectional view of a portion of an example pressure-sensing optical touch system, wherein the top surface of the transparent sheet has one or more layers.

FIG. 11 illustrates an example embodiment where top surface 22 of transparent sheet 20 includes one or more layers 220, with the uppermost layer having a top surface 222. A single layer 220 is shown by way of illustration. Layer 220 can be organic or inorganic. In an example, layer 220 comprises a self-assemble monolayer. An example layer 220 is used to provide a greater amount of hydrophilicity or olephilicity as compared to top surface 22. This in turn could affect the amount or range of optical contact that can be made during a touch event, and thus the amount or range of pressure-dependent optical coupling at the touch event location. Other examples of layer 220 include an anti-reflective layer and a light-wavelength blocking layer.

For example, a hydrophobic touch surface 222 would result in lower optical coupling at a touch event location where the touch event is caused by a moist finger being applied to surface 222 at a given pressure. An example material for layer 220 is fluorinated silane, which would make the surface hydrophobic. The material known as E-Z Clean™, available from Corning, Incorporated, can be used to form such a layer 220.

Other materials for layers 220 can be selected to provide anti-fingerprint characteristics.

In an example embodiment, layer(s) 220 can be glass or a high-index epoxy, wherein the index of refraction is selected to prevent substantial light loss as compared to the light loss associated with surface 22 having an air interface.

Modulated Detector Signal

Figure 12A:
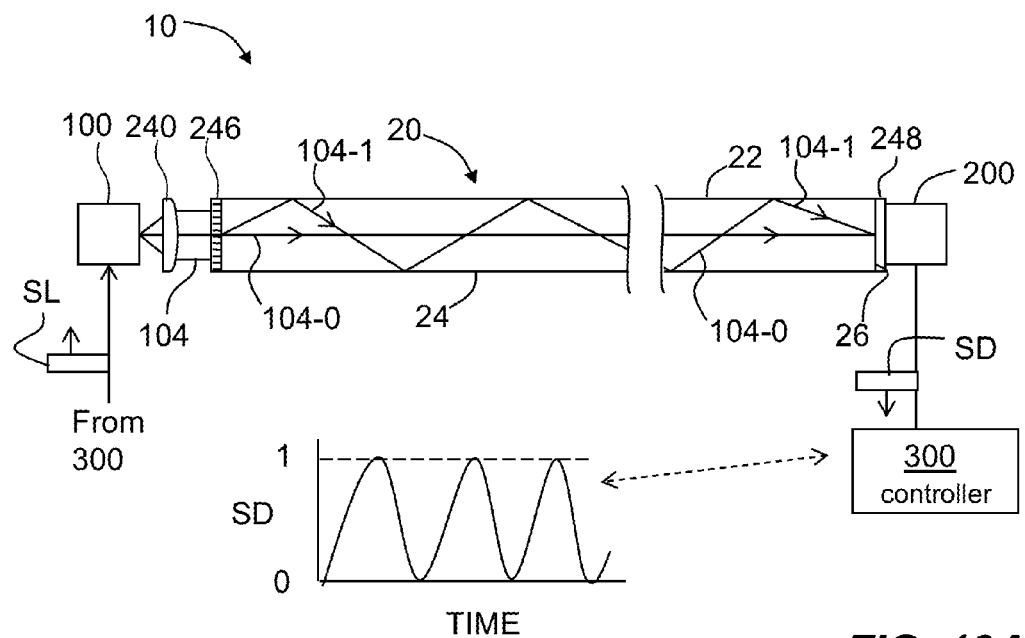
FIGS. 12A, 12B and 13A and 13B illustrate example embodiments of the pressure-sensing optical touch system that utilizes a modulated detector signal to determine differences in the amount of pressure applied at the touch event location.

FIG. 12A is a close-up view of a portion of an example embodiment of optical touch system 10 that utilizes a modulated detector signal to determine an amount of pressure P associated with a touch event TE. Optical touch system 10 of FIG. 12A includes a laser light source 100 (e.g., a distributed Bragg reflector (DBR) laser), a cylindrical lens 240 and a grating 246 arranged adjacent edge 26 of transparent sheet 20, as shown. Detector 200 is shown as arranged adjacent opposite edge 26, with a filter 248 disposed between the edge and the detector to filter out unwanted wavelengths of light, such as visible ambient light, e.g., sunlight.

Laser light source 100 emits light 104 in at least one direction. Cylindrical lens 240 is configured to collimate light 104 so that the light is incident upon grating 246 as collimated light. Grating 246 is configured to split light 104 into two light beams, namely a "zeroeth" light beam 104-0 associated with the zeroeth diffraction order and a first light beam 104-1 associated with the first diffraction order.

Light source 100 is wavelength modulated via processor 302 of controller 300 via light source control signal SL (see also FIG. 1). Both light beams 104-0 and 104-1 are incident upon detector 200 and interfere to create a sine function that moves due to the wavelength modulation and the different optical paths of the light beams. Thus, the configuration defines an interferometer (e.g., a Michelson interferometer). Detector 200 detects the interfered light beams 104-0 and 104-1 and generates a detector signal SD, which is sent to controller 300 for processing. Detector signal SD is processed (filtered) by controller 300 so that only the light at the laser modulation frequency is detected. This can be accomplished, for example, by a lock-in amplifier.

In the situation of FIG. 12A where there is no touch event TE, both light beams 104-0 and 104-1 arrive at detector 200 with substantially the same intensities, or at the very least, a set difference in their intensities. This defines a modulation in the processed detector signal, as shown in the inset, where the modulation contrast is normalized to 1.

Figure 12B:
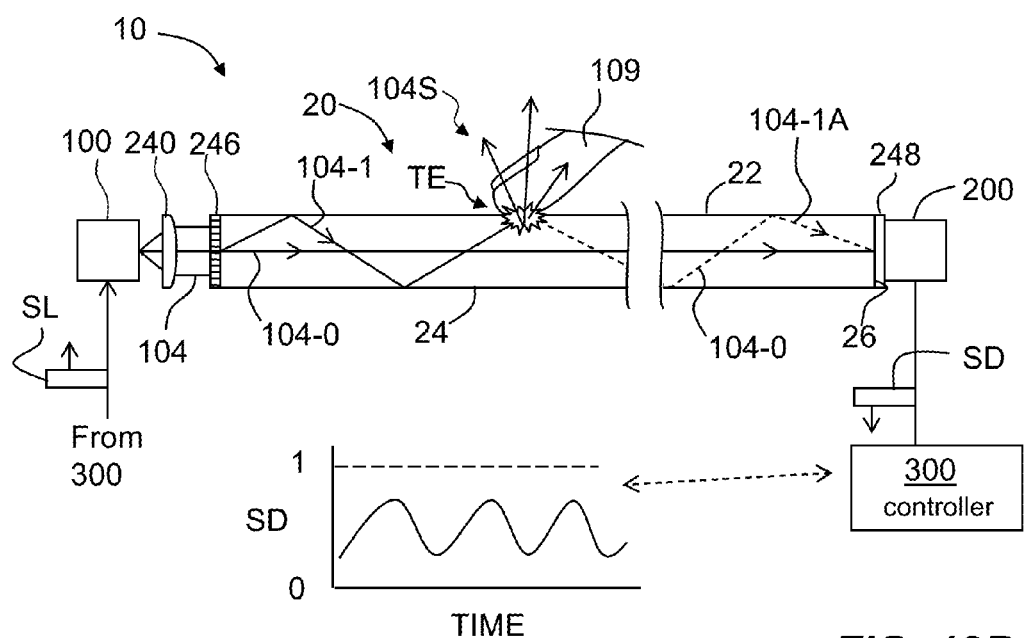

FIG. 12B is similar to FIG. 12A, except that now a finger 109 is pressing down on surface 22 of transparent sheet 20 to cause a touch event TE. This gives rise to scattered light 104S caused by the optical contact with finger 109, which interacts with first light beam 104-1 to form an attenuated first light beam 104-1A that continued on to detector 200. Meanwhile, the zeroeth light beam 104-0 proceeds to detector 200 without being attenuated. Because the first light beam 104-1 has been attenuated to form attenuated light beam 104-1A having less intensity than the original light beam 104-1, the modulation contrast of the processed detector signal SD decreases, as shown in the inset of FIG. 12B. Because the amount of scattered light 104S at the location of touch event TE is a function of the applied pressure thereat, the measured decrease in the modulation contrast is representative of the applied pressure.

Figure 13A:
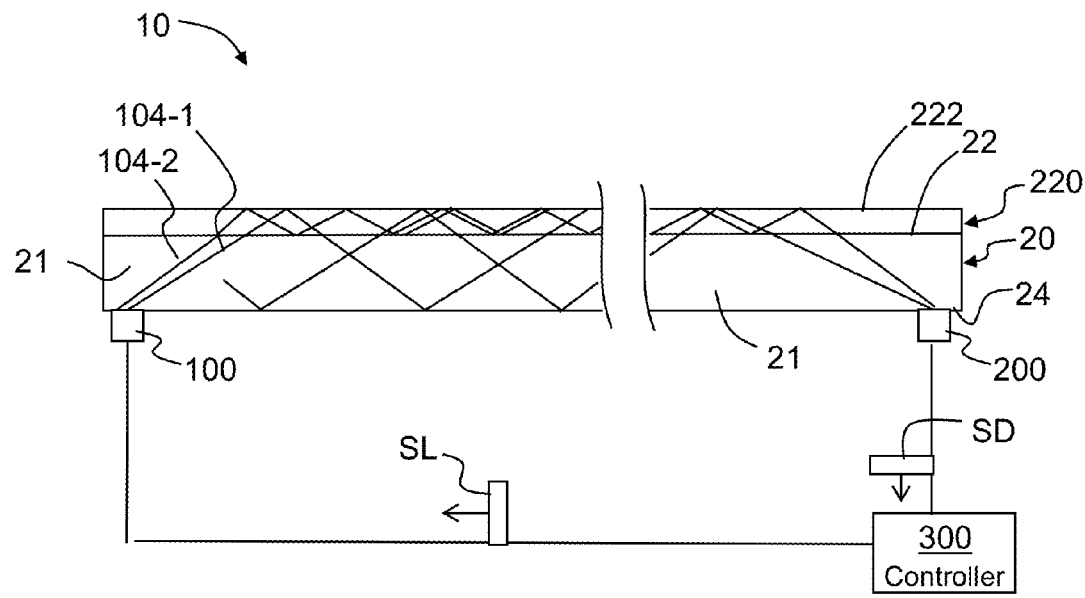

FIG. 13A is a close-up view of a portion of an example embodiment of pressure-sensing touch-screen 10 that includes a layer 220 atop surface 22 of transparent sheet 20. In an example, layer 220 is a graded-index layer formed, for example, by ion exchange in body 21 of transparent sheet 20. Layer 220 may also be layer of constant refractive index, wherein the refractive index is higher than that of body 21 of transparent sheet 20 so that the layer serves as a waveguide layer. Thus, the configuration of FIG. 13A includes a surface waveguide associated with layer 220 and a bulk waveguide associated with body 21 of transparent sheet 20. In an example, gratings 246 or other light-coupling elements or features are disposed near source 100 and detector 200 at the interface between body 21 and layer 220 to couple light in an out of layer 220.

Light source 100 and detector 200 are shown operably arranged adjacent bottom surface 24 of transparent sheet 20. Light 104 emitted by light source 100 takes two main optical paths and so is denoted by light 104-1 that travels in both the surface and bulk waveguides and by light 102-2 that mainly travels in the surface waveguide of layer 220. Because the bulk waveguide associated with body 21 of transparent sheet 20 is thicker than the surface waveguide associated with layer 220, light 104-1 will undergo fewer bounces from the uppermost surface 222 than light 104-2. The index difference between the two waveguides will cause different propagation angles, and thus different optical path lengths for 104-1 and 104-2. Different propagation lengths can be generated by both different angles and indices of refraction. As in the example embodiments described above in connection with FIGS. 12A and 12B, light source 100 is a laser, and the light source is wavelength modulated via light source control signal SL.

The wavelength modulation of light source 100 and the different optical path lengths traveled by light 104-1 and light 104-2 results in interference occurring at detector 200, which gives rise to a modulated detector signal SD. Modulated detector signal SD is processed by controller 300 as described above to extract the modulation contrast in the signal. When there is no touch event, the modulation contrast is at a maximum.

More specifically, the difference of phase $d\phi$ between the 2 propagating waves is given by $d\phi=2\pi L\Delta n/\lambda$, where L is the propagation distance, $\Delta n$ is the difference in the index of refraction between body 21 and layer 220, and $\lambda$ is the wavelength of light 104. This equation for the phase difference assumes that the bulk of the glass that makes up body 21 of transparent sheet 20 is much larger than the surface layer so that the bulk mode is mostly propagating in the bulk as opposed to the surface layer.

By way of example, one can assume a 0.1 meter propagation distance L, an index contrast (difference) $\Delta n=0.01$ (which is typical of layer 220 being formed in transparent sheet 20 using potassium ion exchange) and using a nominal wavelength $\lambda$ of about 1 micron (such as is generated by an IR DBR lasers), the wavelength modulation amplitude that is required to create a fully modulated signal at the detection is about 1 nm, which is well inside the capability laser light source 100 such as DBR or DFB lasers.

The modulation contrast, the intensity I and the modulation contrast C that are determined from detector electronic signal SD are given by:

$$I=I1+I2+2\cdot(I1\cdot I2)^{1/2}\cdot\cos(d\phi)$$

$$C=2\cdot(I1\cdot I2)^{1/2}/(I1+I2)$$

If it is assumed that that the optical energy is equally distributed between the two waveguides, then I1=I2 and the contrast C of the signal is close to 100%.

Figure 13B:
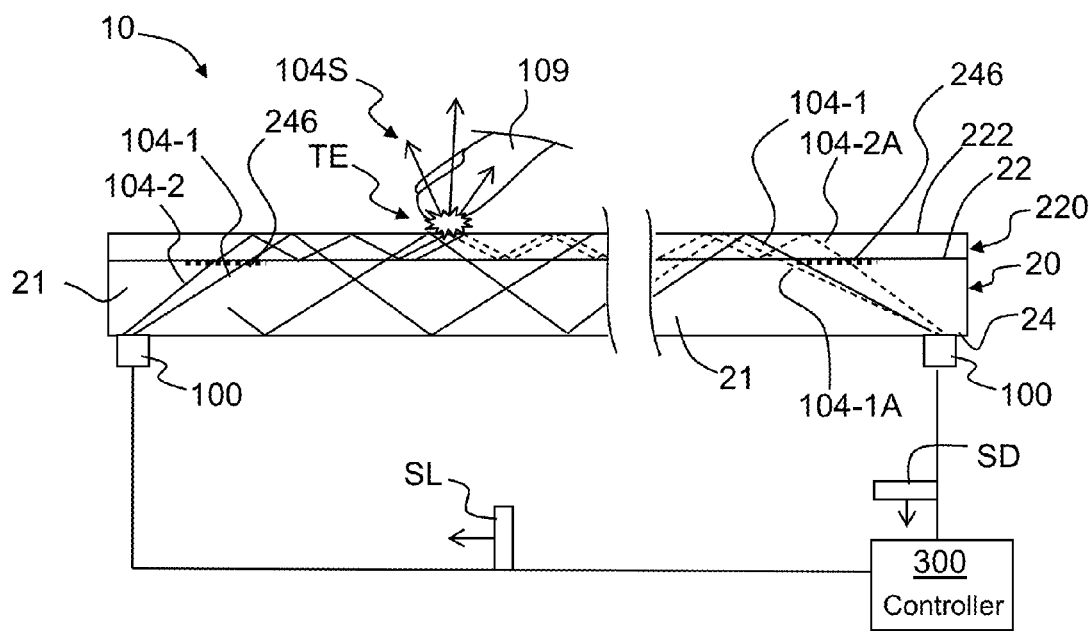

FIG. 13B is the same as FIG. 13A, except that now a finger 109 is pressing down on surface 222 of layer 220 to cause a touch event TE. This gives rise to scattered light 104S caused by the optical contact with finger 109, which interacts with both first and second light beams 104-1 and 104-2 to form scatted light 104S. Because there are more bounces of light 104-2 at surface 222 than for light 104-1, finger 109 interacts with more light 104-2 than with light 104-1. This is illustrated by the extra light rays for light 104-1 and 104-2. In particular, two light rays 104-2 are shown being attenuated to form attenuated light rays 104-2A, while only a single light ray 104-1 is shown being attenuated to form attenuated light ray 104-1A. As a consequence, there will less light 104-2 reaching detector 200 than light 104-1, thereby reducing the modulation contrast in the processed detector signal SD. Stated differently, the interferometer created by the two-layer structure becomes unbalanced. Because the amount of scattered light 104S at the location of touch event TE is a function of the applied pressure thereat, the measured decrease in the modulation contrast is representative of the applied pressure.

It is worth considering the case where the touch event does not create enough light scattering for the change in the detector electrical signal to calculate a substantial change in modulation contrast. This can be the case when the finger is very dry or when wearing gloves or using a soft stylus.

To detect such low-pressure touch events, one approach is employ a relatively thin (e.g., 0.7 mm or less) transparent sheet 20. This allow for the transparent sheet, as well as for the relatively thin layer 220, to be deformed when subjected to localized pressure, resulting into a different propagation length for the light 104 that propagates close to the surface than the light that propagates in body 21 of transparent sheet 20. This in turn affects the interference of light at detector 200 and thus shows up in detector electrical signal SD.

In an example embodiment, the modulated detector signal methods described above are carried out for a large number of interfering light beams 104 traveling within body 21 of transparent sheet so that the interference pattern at detector 200 is complex and resembles a speckle pattern. Because of the large number of interfering beams, the resulting interference/speckle pattern at detector 200 will be sensitive to scattering of light 104 due to a touch event at top surface 22 of transparent sheet 20. This in turn allows for increased sensitivity in detecting an amount of pressure being exerted at the location of touch event TE.

Figure 13C:
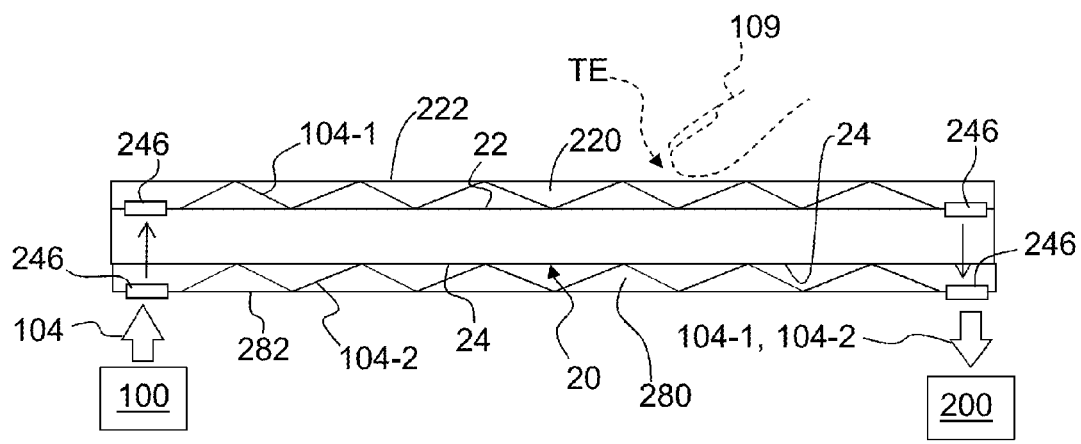
FIGS. 13C and 13D illustrate example embodiments of the pressure-sensing optical touch system that utilizes waveguides at the top and bottom of the transparent sheet.

FIG. 13C is similar to FIG. 13A and illustrates another example embodiment of pressure-sensing system 10 that additionally includes a second high-index layer 280 on the bottom surface 24 of transparent sheet 20. Layer 280 servers as a second relatively thin waveguide. Gratings 246 or other light-coupling elements are disposed relative to light source 100 and detector 200 to couple light 104 into layers 220 and 280 as light 104-1 and 104-2, respectively.

When a touch event TE arises that applies localized pressure at top surface 222, the structure made of transparent sheet 20 and layers 220 and 280 deforms. This in turn causes the optical path length of light 104-1 traveling in layer (waveguide) 220 to change relative to the optical path length of light 104-2 traveling in layer (waveguide) 280. The change in optical path lengths changes the interference at detector 200 in a manner representative of the pressure being applied at the location of touch event TE (shown in phantom with finger 109 in inFIG. 13C).

In one example, the layered configuration of FIG. 13C can be formed using ion exchange (e.g., silver ion exchange) through both top and bottom surfaces 22 and 24 of transparent sheet 20. It is noted that silver ion exchange not only can provide a suitable index change but also may provide the structure with anti-bacterial properties. In another example, the layered configuration of FIG. 13C is formed a coliminate glass structure, where transparent sheet 20 has an index of refraction lower than layers 220 and 280 so that the two outer layers serve as relatively thin waveguides.

As discussed above, in an example embodiment of pressure-sensing system 10, light source 100 is utilized in combination with optical elements that serve to shape light beam 104. An example of such a configuration that utilizes a cylindrical lens 240 and a grating 246 is shown in FIGS. 12A and 12B.

Figure 13D:
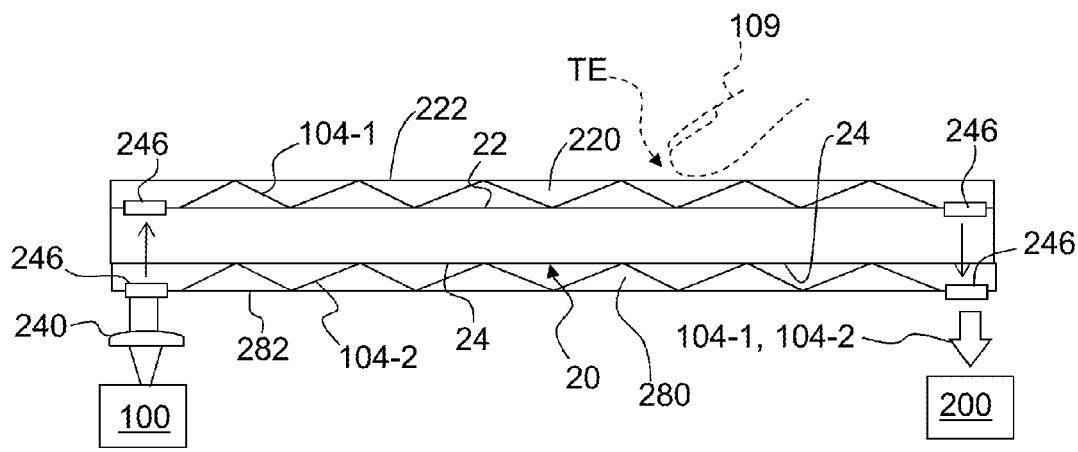
Figure 13E:
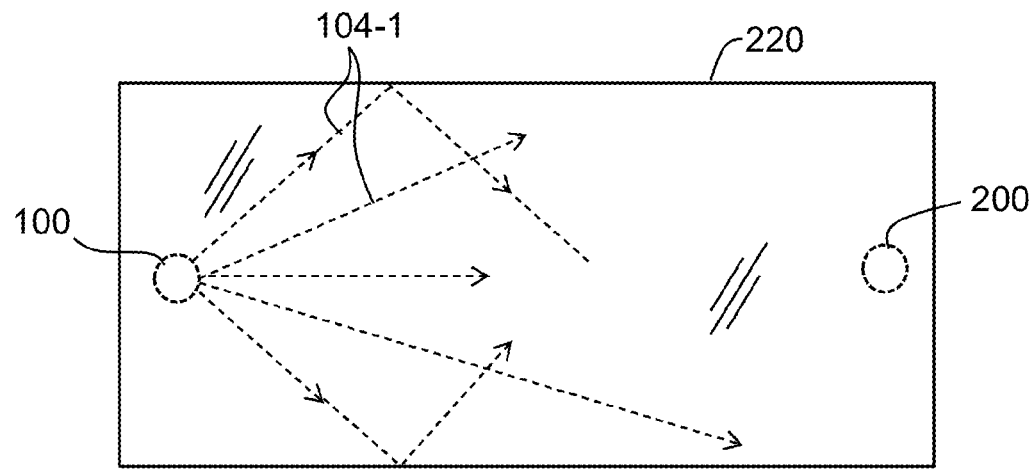
FIG. 13E is top-down view of the waveguide structure shown in FIG. 13D, illustrating how light diverges within the top layer in the direction orthogonal to the propagation of light within the layer.

FIG. 13D and FIG. 13E (top-down view) illustrate an example embodiment based on the multilayer configuration of FIG. 13C, wherein a cylindrical lens 240 is used to collimate light beam 104 so that the light beam can spread in the orthogonal direction. This configuration allows for exciting only a single mode of the waveguides 220 and 280 in the direction of light propagation while allowing the light to diverge in the orthogonal direction to substantially fill the entirety of the waveguides with light. As discussed above, more than one light source 100 may be require to fill the entire volumes of waveguides 220 and 280 with light 104-1 and 104-2, respectively.

In an example embodiment, rather using a light source 100 having multiple light-source elements 102 (see FIG. 3), in an example the light source can be an extended light source that, for example, includes a light-diffusing optical fiber. In such an embodiment, the cylindrical lens 240 can extend the length of the extended source, with the extended light source being arranged substantially at the focal position of the cylindrical lens.

Figure 13F:
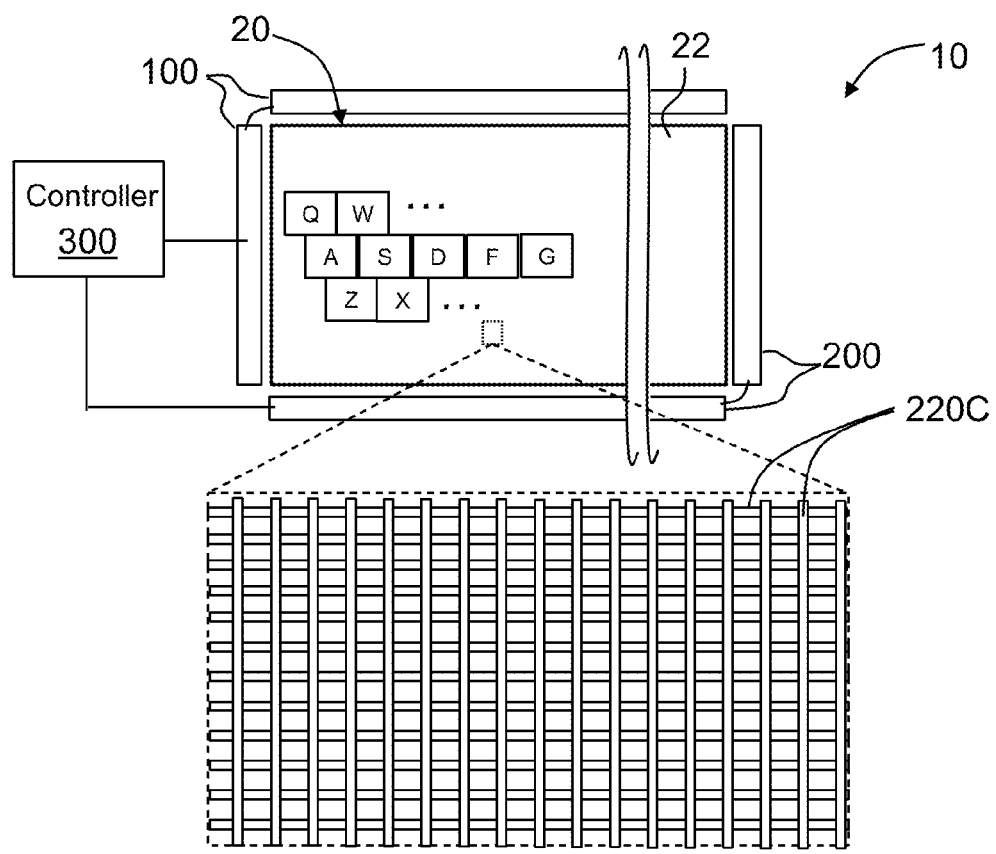
FIG. 13F is an example embodiment of the pressure-sensing optical touch system wherein an array of channel waveguides is disposed on the top surface of transparent sheet, and wherein the system is configured by way of example as a keyboard that responds to pressure applied at select locations on the transparent sheet.

In an example embodiment, rather than layer 220 being a single slab waveguide, a number of channel waveguides 220C running in the (x,y) directions can be deployed, as illustrated in the schematic diagram of pressure-sensing system 10 of FIG. 13F, which is shown configured as a keyboard device by way of example. The channel waveguides 220C can be thin-film based or formed by ion-exchange. Further in the example embodiment, detector 200 can be configured with detector elements arranged to receive light 104 from the individual channel waveguides.

Such a configuration can be used to determine the (x,y) location of a touch event, along with an amount of pressure being applied at the touch location of a touch event TE. It also enables determining the locations and pressures of two or more simultaneous touch events TE. This capability is useful for applications such as the keyboard application illustrated in FIG. 13F or other applications where simultaneous touch events could be used. The channel waveguides 220C can have a variety of different sizes to match the particular application. For example, for a keyboard application, one or perhaps a few waveguides per key would be required, though tens or many tens or even hundreds of waveguides could also be used per key to obtain oversampling/redundancy of the pressure measurement at the touch event location corresponding to a key stroke.

Light Sources

Example light sources 100 were discussed above, and included light-emitting diodes, laser diodes, fiber lasers, as well as extended sources that include for example light-diffusing optical fiber.

In an example embodiment, light source 100 is a laser that has three main characteristics: a) single mode, 2) a tunable wavelength by up to 1 nm, and 3) relatively inexpensive.

One type of light source that includes these characteristics is the aforementioned DBR laser. A particularly suitable DBR laser light source 100 is one that operates at 1060 nm. Such lasers have three main sections: a gain section, a grating section (also the DBR section) that includes a Bragg grating, and a phase section in between the gain and grating sections. Bragg grating that provides wavelength dependent reflectivity and allows for selecting a central wavelength of the laser by applying the appropriate signals. The phase section is used to adjust the wavelength of the selected mode.

Thus, in a DBR laser, the wavelength can be modulated by applying a signal to either the phase section or to the DBR section. However, if the signal is applied to only one of the two sections, the wavelength will experience abrupt wavelength jumps instead of smooth and continuous wavelength variations. However, by applying specific signals to both the DBR section and the phase section, continuous wavelength tuning with mode hops can be obtained. Thus, in example embodiment, light source 100 is configured as a DBR laser wherein the wavelength is continuously tunable without mode hops.

Pressure Sensing Calibration

Aspects of the disclosure include methods of pressure-sensing calibration and force measurements of optical touch system 10 to facilitate developing algorithms for sensing, reporting, and characterizing a system response to various implements used for creating a touch event, such as a finger, a pencil, a stylus, a pen, etc. In an example embodiment, strain-sensing or force-sensing devices (e.g., strain gauges, piezo-electric devices) are used to measure force or pressure associated with a touch event recorded by pressure-sensing optical touch system 10, and optionally provide haptic feedback.

Figure 14A:
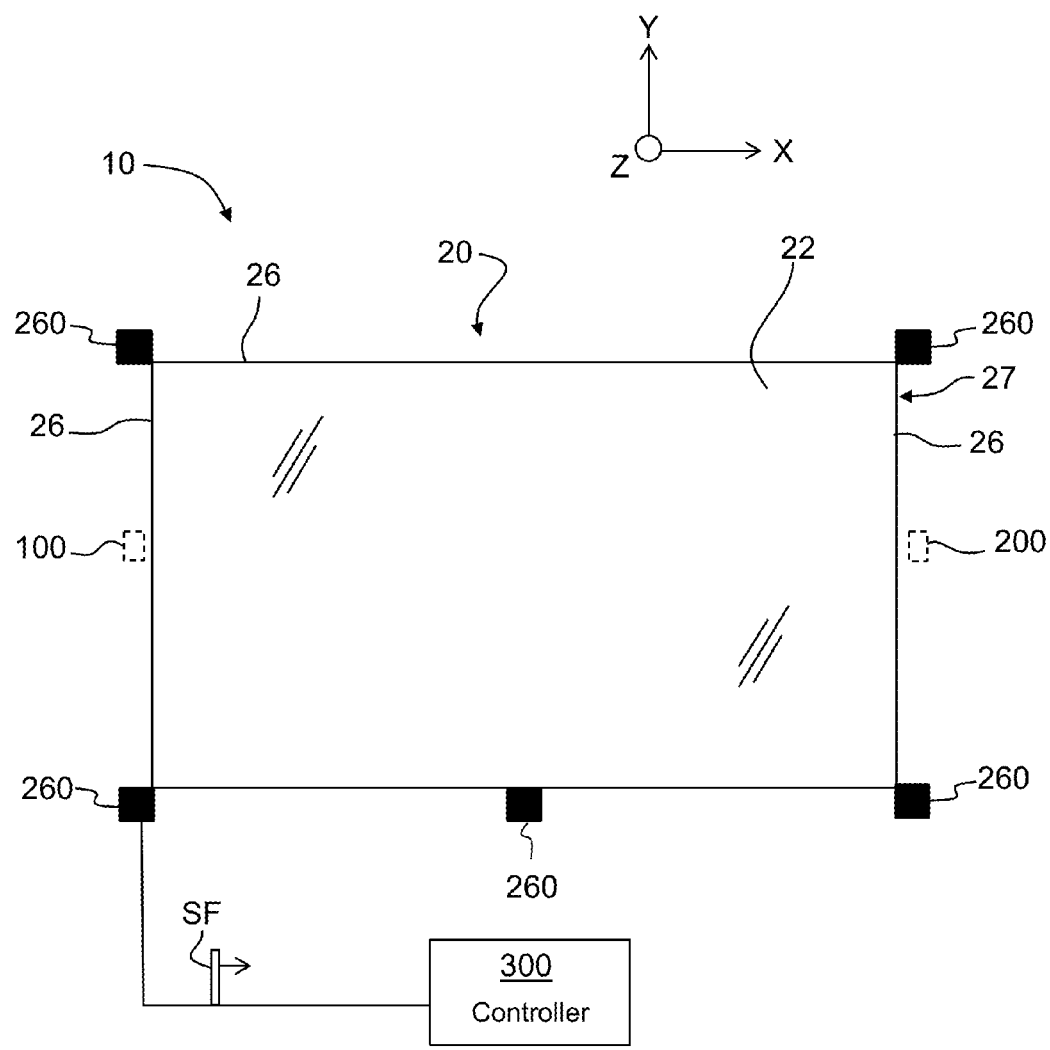
FIGS. 14A and 14B illustrate different example embodiments wherein force-sensing devices are employed in the pressure-sensing optical touch system to measure an amount of force being applied to the top surface of the transparent sheet of the pressure-sensing touch system.

FIG. 14A is a plan view of a portion of optical touch system 10 that includes a number of force-sensing devices 260 that are configured such that transparent sheet 20 is suspended by the force-sensing devices so that movement is confined to a single axis, such as the Z-axis as shown. Force-sensing devices 260 can be located along edges 26 or at the corners, or at a combination of such locations, as shown in FIG. 14A. Thus, when a touch event occurs such as described above, the amount of force associated with the touch event is measured by force-sensing devices 260, which in an example are electrically connected to controller 300 and provide force-sensing signals SF thereto for processing. One such electrical connection and corresponding signal SF is shown by way of illustration.

Figure 14B:
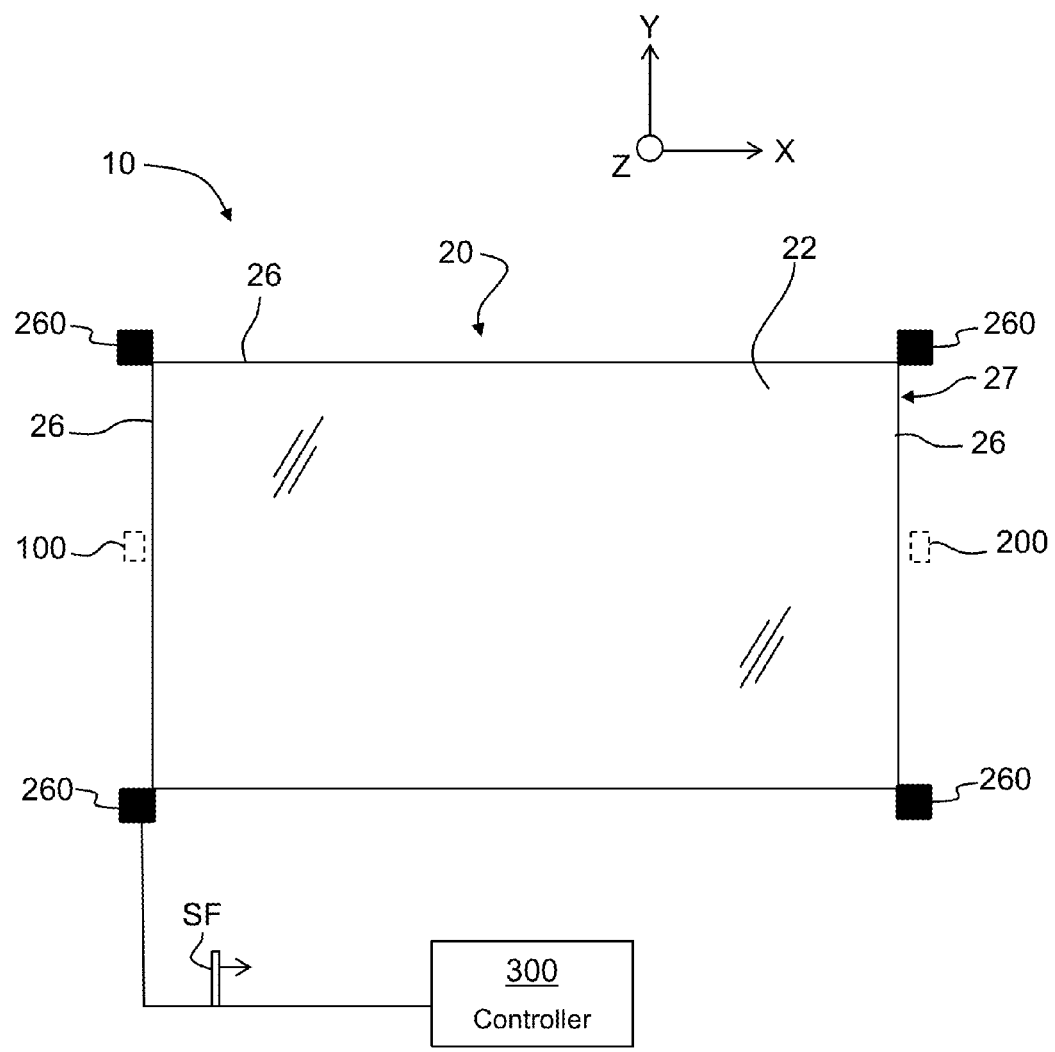

FIG. 14B is similar to FIG. 14A but has a force-sensing device configuration that allows for the force to be detected in more than one axis. This multidimensional force sensing method can be useful in advance control applications such as games, medical devices, industrial device, etc.

Force-sensing devices 260 can be or include any of the known and commercially available force-sensing devices. These include, for example, a) force-sensing resistors, which are small and flexible and are thus easily incorporated into pressure-sensing optical touch system 10; b) piezo-electric-based force-sensing devices that translate a mechanical deformation into a measurable electric charge; c) strain gauges based on electric circuits; d) optical strain gauges, such as fiber-optic-based strain gauges; e) capacitive strain gauges; and f) accelerometer-based force sensors.

An aspect of the disclosure includes using one or more force-sensing devices to characterize the amount of force applied at a touch event to provide an absolute measurement of either the applied force or the applied pressure at the touch event. The force measurement information can be stored in controller 300 and then used to characterize the nature of a given touch event based on the amount of force or pressure that is optically detected based on the methods described above.

Capacitive-Optical Pressure-Sensing Display System

Optical touch system 10 can be used in combination with conventional position-sensing display systems, such as pCap systems to define a hybrid capacitive-optical pressure-sensing touch system. FIG. 15A is a schematic elevated view of such a hybrid touch system 400 formed by operably arranging optical touch system 10 adjacent and above (e.g., atop) a conventional capacitive display unit 410, such as a liquid crystal display.

FIG. 15B is a schematic cross-sectional, partial exploded view of an example hybrid touch system 400 illustrating an example of how to integrate optical touch system 10 with conventional capacitive-based display unit 410. The conventional display unit 410 is shown in the form of a liquid crystal display that includes a backlighting unit 414 that emits light 416, a thin-film transistor (TFT) glass layer 420, a liquid crystal layer 430, a color filter glass layer 450 with a top surface 452, and a top polarizer layer 460 with a top surface 462, all arranged as shown. A frame 470 is disposed around the edge of color filter glass layer 450. Light source 100 is shown by way of example as being operably supported within frame 470. This forms an integrated display assembly 480 having a top side 482.

With reference now to FIG. 15C, to form the final hybrid touch system 400 that has optics-based pressure-sensing capability and capacitive-based (x,y) location-sensing capability, transparent sheet 20 is added to integrated display assembly 480 of conventional display unit 410 by operably disposing the transparent sheet on top side 482 of the display assembly. The transparent sheet 20 optionally includes the aforementioned cover 40 in the form of an IR-transparent but visibly opaque layer disposed adjacent light source 100. An absorbing layer 28 can also be included at edge 26 of transparent sheet 20 to prevent light 104 from reflecting off the edges of the transparent sheet.

Figure 15D:
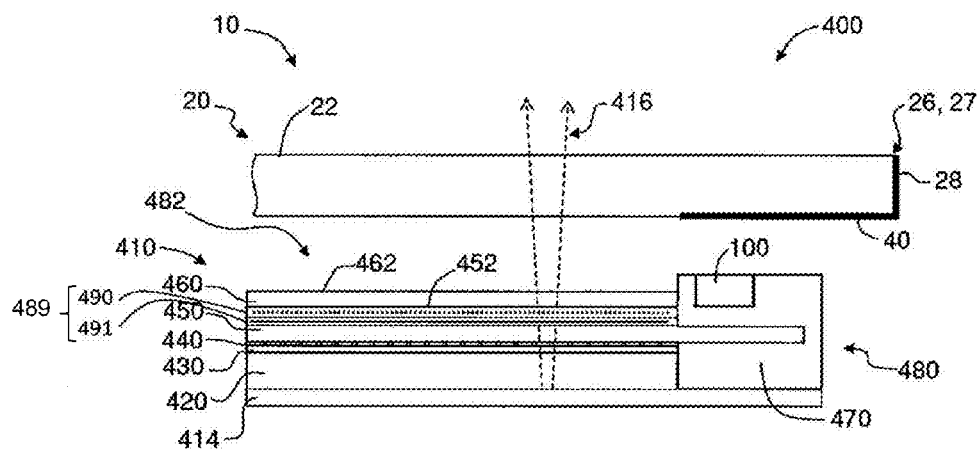

FIG. 15D is a schematic cross-sectional, partial exploded view of an example hybrid touch system 400 as in FIG. 15B, but with the further inclusion of a capacitive sensor 489, which in an example comprises drive lines 490 encapsulated in a bonding layer and/or insulating material along with sensing lines 491 that run orthogonal to the drive lines and that may also be encapsulated in an insulating and/or bonding material.

In the embodiment of hybrid touch system 400 of FIGS. 15B and 15C, light source 100 is face-coupled to bottom 24 of transparent sheet 20 through the aforementioned IR-transparent cover 40. There is also an optional air gap 474 formed between transparent sheet 20 and top polarizer layer 460. In an example embodiment, air gap 474 can be replaced with a low-index layer 475 that can contact the top polarizing layer 460, or whichever surface transparent sheet 20 may need to rest upon. Low-index layer 475 serves to preserve the waveguiding properties of transparent sheet 20 when the transparent sheet need to be placed in contact with a surface, especially one that has a higher index of refraction than the transparent sheet. In an example, the low-index layer 475 is made of a bonding material that is used to bond transparent sheet to an underlying surface.

In an example, various indicia or indicium (not shown) may be presented to user 500 on or through transparent sheet 20 to guide the user to interact with optical touch system 10 of hybrid touch system 400. By way of example, the indicium may include areas on top surface 22 of transparent sheet 20 that are set aside for indicating user choices, software execution, etc., or to indicate a region where the user should create touch event TE. Such region, for example, might be required where light 104 does not reach certain portions of top surface 22.

Capacitive Position Sensing with Optical Pressure Sensing

In addition to merely performing (x, y) location touch sensing, there are a large number of applications where it would be desired to sense pressure. For example, traditional keyboards are activated by the user pressing harder on a key, not merely putting a finger on the key.

In one embodiment, hybrid touch system 400 comprises a first structure having a capacitive touch-based sensing component (e.g., capacitive sensor 489) and a second structure comprising an optical touch-based sensing component (e.g., optical touch sensor 10). In some embodiments, the capacitive touch-based sensing component (sensor) is used to detect the (x,y) position of one or more touch events TE. In some embodiments, the optical touch-based sensing component (sensor) is used to determine the pressure or force applied to di by one or more touches. In some embodiments, the optical touch-based sensing component utilizes total internal reflection. In some embodiments, the optical touch-based sensing component provides an absolute pressure or force measurement. In some embodiments, the optical touch-based sensing component provides a relative pressure or force measurement.

In an example embodiment, optical touch sensing as taught herein and in U.S. Appl. Nos. 61/564,024 and 61/640,605 is sensitive to finger pressure. Though not measured directly, it turns out that with increasing pressure of the finger, more light is coupled out of transparent sheet 20, as described above. While not wanting to be held to a particular theory, it is believe that the correlation in light out-coupling to pressure is a function of a number of factors, including ridge-collapse on the epidermis layer, wetting from sweat glands, and blood circulation through the pressured area. This emphasizes the different nature of coupling needed for capacitive versus optical, which has to do with the basic methods involved—electronic current in pCap and electromagnetic radiation in the optical processes.

Figure 16:
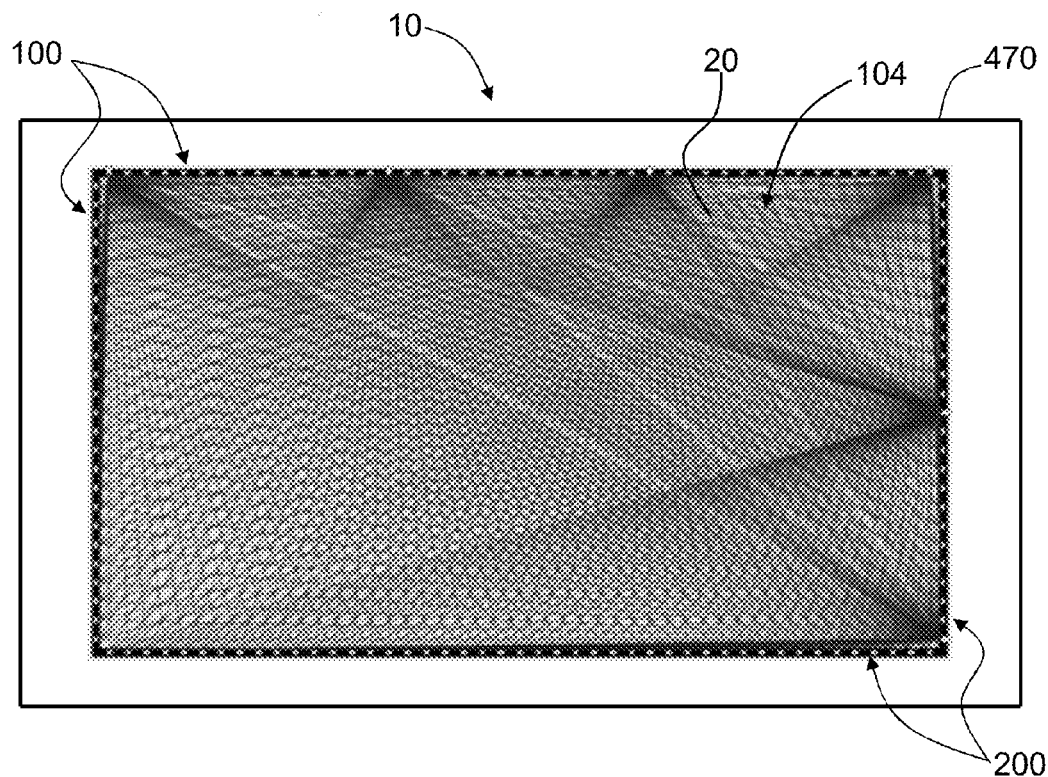
FIG. 16 is a top-down view of the hybrid touch system that shows a mesh of light rays created by a collection of emitters and detectors, wherein the number of emitters and/or detectors is closely correlated to the system resolution.

FIG. 16 is a top-down view of an example system 100 that includes a relatively large number of photodiodes and detectors 200 produce a mesh of light rays 104 that enables precise touch-event and touch-location detection. Further, the number of emitters and detectors 100 directly correlates with the energy used by system 10. In some embodiments, wherein multiple-touch resolution is desired, the need to determine multiple touch locations TL makes the energy and emitter/detector numbers even higher.

As described in U.S. Appl. Nos. 61/564,024 and 61/640,605 and herein, one factor that drives how many light sources 100 and detectors 200 are needed for an optical touch system 10, and in some embodiments, where to place them, is the detection resolution on the touch screen (i.e., transparent sheet 20). The collection of light sources 100 and detectors 200 create the aforementioned mesh of light rays 104, as shown in FIG. 16. The density of light rays 104 is closely correlated to the resolution achieved. Thus, if there are too few light rays 104 in some region of the screen, and the spacing between light rays them is too large, then the sparsely covered region will have a lower detection resolution as compared to the more densely covered regions.

For finger tracking via optical means, a relatively high resolution is required (e.g., less than 1 mm), to ensure for example that a touch event in the form of a straight line traced by finger is indeed tracked and drawn as straight line. This necessity means that more light sources 100 and/or detectors 200 are necessary. Further, in some embodiments, the light sources 100 and/or detectors 200 need to be densely packed or in close proximity. In the example embodiment shown in FIG. 16, a large number of photodiode light sources 100 and detectors 200 produce a mesh of light rays 104 for precise detection of the touch location TL of a touch event TE. Further, the number or light sources 100 and detectors 200 directly correlates with the energy optical touch system 10 consumes. In some embodiments, wherein multiple touch-event resolution is desired, the need to determine multiple touch locations TL makes the energy and light-source/detector numbers even higher.

The combination of pCap sensing and optical sensing in a single hybrid touch system 400 can relieve many of these requirements. In some embodiments, combining pCap sensing for (x,y) position determination and optical sensing for force or pressure determination provides unexpected and synergistic improvements to the touch experience and the ability to enable additional touch actions that are difficult or impossible with either technology alone. In an example embodiment where optical sensing is used to detect pressure or force associated with a touch event TE and capacitive sensing is used to detect (x,y) position of the touch location TL, the fact that the optical sensing can rely on the (x,y) location given by the capacitive sensing allows for a number of benefits to the combination device. First, the complexity of the optical touch system 10—for example, the number of emitters and detectors—can be decreased as high (x,y) resolution for the optical sensing component is less critical. Second, as the capacitive device is being used to determine the location of each of the one or more touch events TE, the algorithms used in optical touch system 10 to back out touch events and touch pressure can be less complicated and can more easily reconstructed from the "optical image" of objects on the face of the screen. Third, because of the advantages of the first two benefits, the amount of power consumed by the optical touch system 10 can be dramatically decreased, and can even allow the optical touch system to stay at least partially dormant, e.g., to illuminate only part of the touch screen, as needed.

For finger tracking via optical means (x, y), very high resolution is required (less than 1 mm), to ensure for example that a straight line drawn by finger 109 is indeed tracked and drawn as straight line. This necessity means that more emitters 100 and/or detectors 200 are necessary and further, in some embodiments, means that the emitters and/or detectors need to be densely packed or in close proximity.

For example, rather than needing sub-millimeter accuracy in tracking, optical touch system 10 needs only to identify the pressure from objects of, for example, area larger than 25 $mm^2$ (assuming a surface area of 5 mm×5 mm for a finger). By limiting the tracking accuracy, it is possible to reduce the number of light source 100 and/or detectors 200 needed. In addition, there is no need for disambiguation by the optical touch system 10. The capacitive sensor 489 will already identify the relevant touch event TE on the screen, and thereby making it possible to utilize these touch events to determine the pressure for each touch event.

In some embodiments, capacitive sensor 489 may be dominant. In such embodiments, capacitive sensor 489 is active as needed, and hybrid touch system 400 calls upon optical touch system 10 to perform pressure-sensing capability when the need arises—for example when an application requiring pressure-sensing or force-sensing is desired. Examples of such applications include typing programs, video games, and camera or video software.

Figure 17:
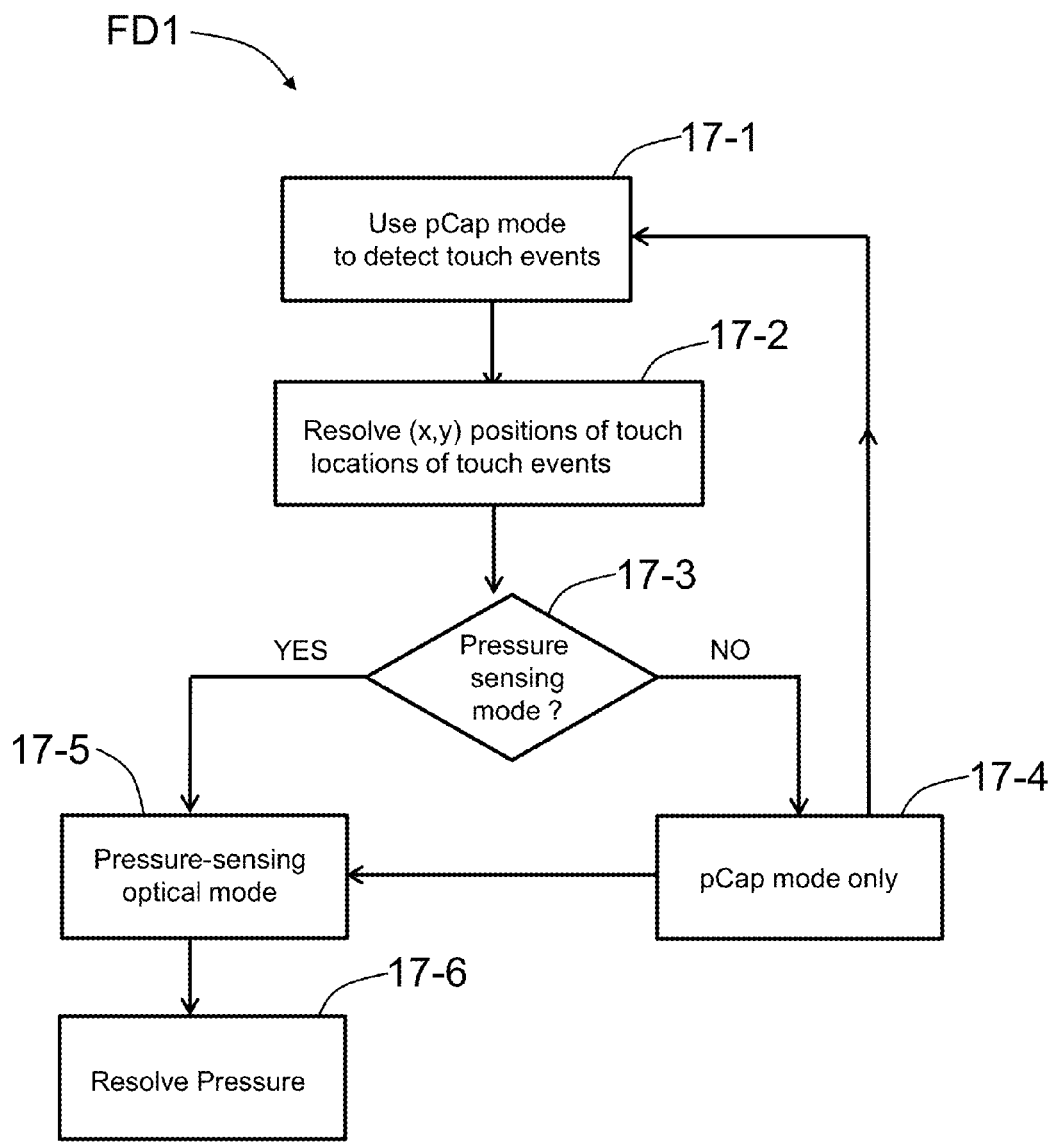
FIG. 17 sets forth a flow diagram of one embodiment of a method for resolving x- and y-positions of one or more touch events using the hybrid touch system disclosed herein.

FIG. 17 sets forth a flow diagram FD1 of one embodiment of a method for resolving (x,y) positions of one or more touch locations TL of one or more touch events TE using both the capacitive sensing capability and optical pressure-sensing capability of hybrid touch system 400. In some embodiments, hybrid touch system 400 utilizes pCap touch-location information from a pCap sensing mode to determine the number of touch events TE and their respective locations TL. In some embodiments, system 10 can limit the light source and detector output in a pressure-sensing mode based on the pCap information to cover or engage only certain touch-screen areas, such as those areas noted above where the touch events TE are known to be or are expected to be occurring. This avoids extraneous computational and/or energy usage by eliminating the need to optically scan areas of transparent sheet 20 that have not been or are not being touched.

With reference to FIG. 17, step 17-1 starts the method by using system 10 in the pCap mode to detect the presence of one or more touch events TE. The method then proceeds to step 17-2, which involves resolving the (x,y) positions of the touch location TL of each touch event TE based on the capacitive position information obtained in step 17-1. The method then proceeds to step 17-3, which inquires whether the pressure-sensing mode is to be used. If the answer is No, then the method proceeds to step 17-4, which calls for the system to work in pCap mode only. If the answer is Yes, then the method proceeds to step 17-5, which involves detecting the pressure associated with each touch event TE using the pressure-sensing optical mode, as described above. The method then proceeds to step 17-6, which involves resolving the pressure at the one or more touch locations on the touch-screen device based on the information obtained in step 17-5.

Note that in step 17-4, an option is to prompt for using the pressure-sensing mode, at which point the method moves from step 17-4 to step 17-5, and then to step 17-6.

In another example embodiment, hybrid touch system 400 employs optical sensing over a portion transparent sheet 20. In some embodiments, the optical-sensing portion corresponds to a "control" region, such as a key pad, device controls, the edge or border region, etc. By detecting which beams 104 are attenuated by a touch event TE, one can deduce what button was pushed, which slider interaction performed, etc. In some embodiments, multi-touch capability and absolute touch-sensing accuracy are not necessary.

In some embodiments, hybrid touch system 400 may incorporate a low-power mode. In some embodiments, the low-power mode comprises a mode wherein, when there are no touch events TE that occur within a certain time duration, the system detects a "wake-up" touch event. As an example embodiment, by either by using a wide-angle illuminator/detector, or by using single ray (emitter-detector), hybrid touch system 400 can detect an object touching the screen. In some embodiments, the optical wake-up touch is queued to a certain object. In some embodiments, the certain object comprises a human finger or skin. In some embodiments, the optical wake-up touch is not responsive to touches by objects other than a human finger or skin. In some embodiments, the optical wake-up touch activates capacitive sensor 489.

The optical "decoding" algorithm necessary to reconstruct an image of objects touching transparent sheet 20 can be made much simpler if the touch location(s) and the general shape of the object(s) is/are already known. In some embodiments, the algorithms necessary to determine force or pressure of the at least one touch event TE based on touch information collected by system 10 may incorporate information on the touch location TL of the at least one touch event TE derived from the pCap system. For example, it is generally necessary to use tomographic or other high level algorithms to determine the touch locations TL for multiple touch events TE detected using optical sensing methods. However, the combination of capacitive and optical sensing of hybrid touch system 400 allows for use of simpler algebraic reconstructions.

In an example embodiment, if the position of one of more touch events TE is known, it is possible to assign an unknown attenuation $A_i$ for each "pixel" inside corresponding touch areas. Then one equation can be written for each photodetector j and emitter (light source) k that show some change compared to a baseline:

$$-\ln(P_{jk}) = \sum_{i=1}^{n} W_{ijk} A_i \quad (1)$$

wherein the parameter $W_{ijk}$ represents the fraction of pixel i on the path from photodetector j to emitter k. If an entire pixel is in the optical path of light ray 104, the term has a weight equal to one. The parameter $P_{jk}$ represents the normalized power measured by photodetector j when emitter k is turned on, with the power being normalized to a baseline power.

Since multiple paths j, k will be impacted by each "touch" pixel, there are more type (1) linear equations than unknowns (A). The linear equations may be solved by finding a solution vector A that minimizes the overall error (e.g., the least-square error). An estimate of the total force applied to the area is obtained by summing the attenuation for the pixels belonging to the same touch area. This simple algorithm is enabled by the fact that it is known that there was no attenuation on other pixels. Other similar algebraic-based algorithms known in the art can also be similarly employed.

In another example embodiment, it is useful to know whether a live-finger 109 is touching the screen, or whether the touching implement is some kind of stylus or other object. Capacitive-based touch sensors can be fooled by certain materials that have similar effects on the electrical signal. However, in some embodiments, optical methods are sensitive to a specific characteristic of a human finger, such as wetting or blood-flowing features of the finger. Thus, in certain embodiments, optical touch system 10 is adapted to detect or look for certain signatures in the touch response for a human finger. In some embodiments, these signatures include fingerprints, wetting, blood-flow, absorption of certain wavelengths of light, etc.

Figure 18:
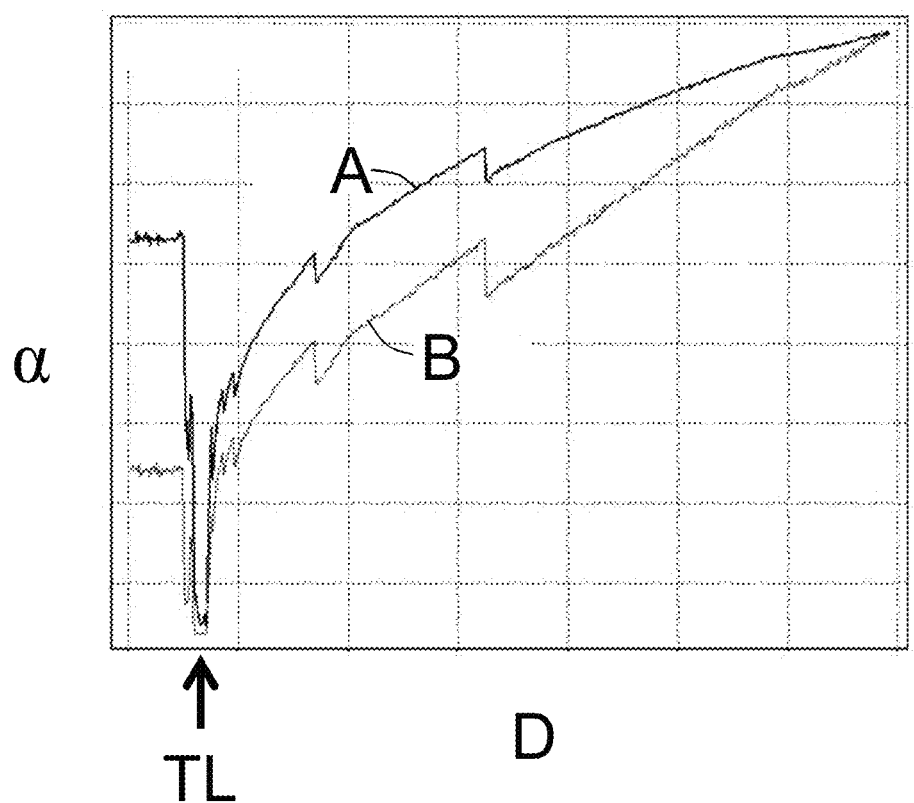
FIG. 18 is a plot of attenuation a (arbitrary units) versus position (arbitrary units) relative to a touch location (TL) of a touch event caused by a finger held at constant pressure against the transparent sheet of the pressure-sensing touch system, wherein curve A is for green/blue light and curve B is for red light.

FIG. 18 is a plot of attenuation a (arbitrary units) versus distance D (arbitrary units) relative to a touch location TL of a touch event TE caused by a finger 109 held at constant pressure against transparent sheet 20. Curve A describes attenuation of a green/blue light for light rays 104 and curve B describes the attenuation of red light for light rays 104. The difference in the attenuation amounts for the two curves is attributable to the increased absorption of red light 104 in the finger due to blood flow therein relative to green/blue light.

Alternatively, in some embodiments, it may be useful to design the optical touch system 10 to detect or look for non-human touch events. Capacitive touch systems (sensors) are generally insensitive to gloved human hands or other objects with little current or electric field. In such circumstances, it may be useful to rely on optical-based touch systems to address this limitation and provide (x,y) location information or tracking information. In some embodiments, the optical touch system 10 can also be used for (x,y) location determination or can act as a supplementary (x,y) position sensor.

In some embodiments, optical touch system 10 is dominant in hybrid touch system 400 and when a touch even is optically detected but that does not register as a pCap touch event, the optical touch system becomes active for determining (x,y) positioning information. In some embodiments, the (x,y) position resolution of the optical touch system 10 is less accurate than the pCap touch system. In some embodiments, the non-human touch object/implement comprises a gloved hand, a stylus, a pen, a brush, etc.

Figure 19:
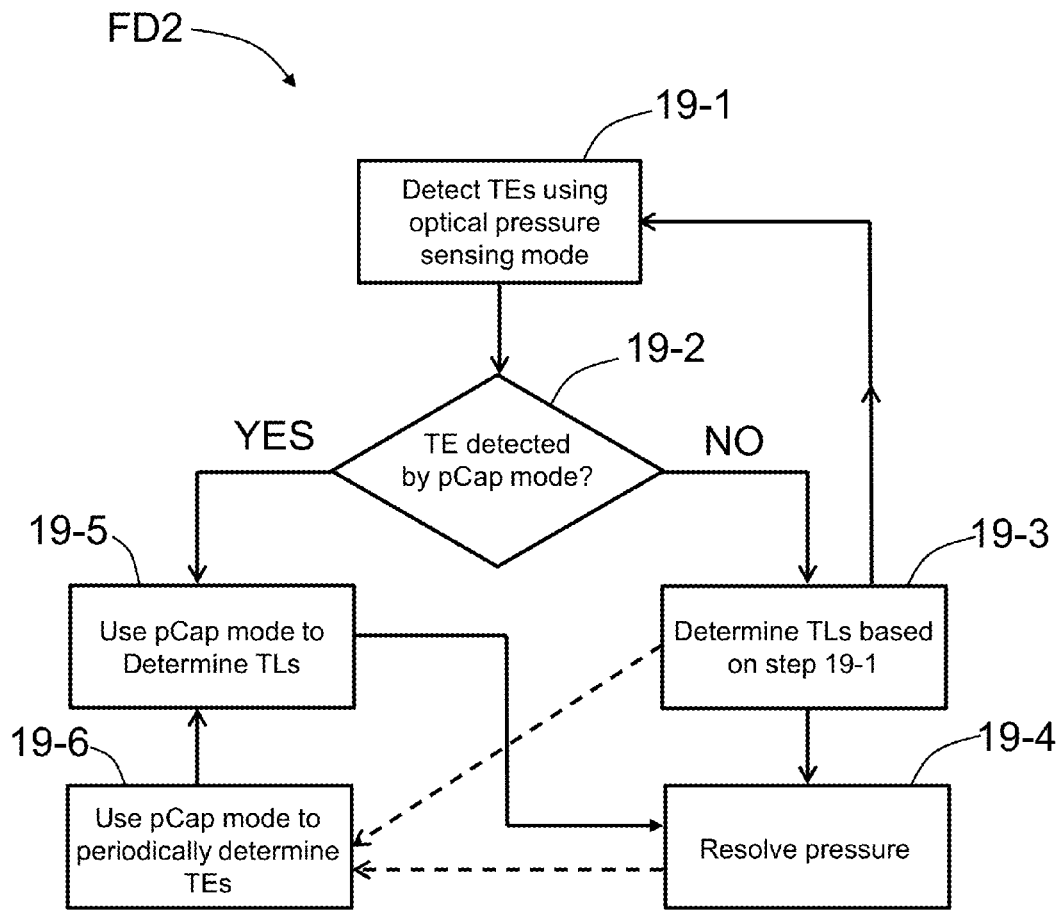
FIG. 19 sets forth a flow diagram of one embodiment of a method for utilizing an example hybrid touch system as disclosed herein to detect a touch event that may not be detected initially or detected at all by the capacitive sensor of the hybrid touch system.

FIG. 19 illustrates a flow diagram of an example embodiment of a method for utilizing hybrid touch system 400 to detect a touch event TE that may not be detected initially or detected at all by capacitive detection. In such a case, optical touch system 10 of hybrid touch system 400 can be used to both resolve the (x,y) position of one or more touch events TE and the associated one or more pressures.

Step 19-1 of the method involves detecting one or more touch events TE on touch screen 20 using the optical-based pressure-sensing mode enabled by optical touch system 10. Step 19-2 inquires whether the touch event TE was detected by the system's pCap mode enabled by capacitive sensor 489. If the answer is No, then the method proceeds to step 19-3 in which the touch locations TL of each touch event is determined based on the information obtained in step 19-1. The method then proceeds to step 19-4, which resolves the pressure of each touch event TE at the corresponding touch locations TL using the methods described above.

If the answer to the inquiry of step 19-2 is Yes, then the method proceeds to step 19-5, which utilizes the pCap mode to resolve (determine) the touch locations TL for each touch event TE. The method then proceeds to step 19-4 to determine the pressure of each touch event TE at the corresponding touch locations TL based on the information obtained in step 19-5.

The method includes an optional step 19-6 after either step 19-3 or step 19-4 of periodically determining whether touch events TE are detected in the pCap mode. If the pCap mode detects one or more touch events TE, then the method can proceed to step 19-5 to resolve the touch locations of the touch events using the pCap-mode data. The dashed-line arrows connecting steps 19-3 and 19-4 to step 19-6 illustrates the optional nature of step 19-6.

Thus, in some embodiments, the combination of pCap mode for (x,y) position determination and the optical-based pressure-sensing mode for force or pressure sensing provides for improved determination of "real" touches. Here, the term "real" means either actual contact that was intended to produce a touch event TE, as compared to "non-real" touch. A non-real touch may be from inadvertent or otherwise unintentional contact of the users body, clothing or other material or implement, that affects the capacitance of the pCap sensing system. A non-real touch can also be from noise or other background signaling that may affect the capacitance of the pCap system to the extent that it creates a signal that looks like a touch event has taken place.

In some embodiments, the combination of optical-based and pCap sensing can allow for discrimination of what type of device is being used to contact top surface 22 of transparent sheet 20 (i.e., the touch surface of system 10). In some embodiments, the touch surface 22 is capable of discriminating between fingers and other touch devices, such as, but not limited to, styluses, pens, gloves, brushes, etc. In some embodiments, the optical sensing element acts as a supplemental touch detection or positioning system.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A hybrid touch system for sensing both a touch location of a touch event and an amount of pressure at the touch location, comprising:
    a. a capacitive touch sensor;
    b. an optical touch sensor operably arranged relative to the capacitive touch sensor, wherein the optical touch sensor includes:
        i. a transparent sheet having a monolithic body in the form of a single element made of a single material, the monolithic body having a top surface, a bottom surface, and a perimeter that includes an edge, wherein the touch event occurs on the top surface at the touch event location and has an amount of contact area that corresponds to the amount of pressure;
        ii. at least one light source operably arranged relative to the transparent sheet and that emits light that is coupled into the transparent sheet so that the light travels within the monolithic body of the transparent sheet via total internal reflection from the top and bottom surfaces only; and
        iii. at least one detector operably disposed immediately adjacent to the transparent sheet and that generates a detector electrical signal having a signal strength representative of a detected intensity of light traveling within the monolithic body of the transparent sheet, wherein the touch event at the top surface of the transparent sheet scatters the light traveling within the monolithic body of the transparent sheet, thereby causing a change in the detected light intensity that corresponds to a change in the amount of contact area at the touch location that is representative of a change in the pressure applied at the touch location;
    c. a software means for utilizing the capacitive touch sensor to determine the touch location of the touch event; and
    d. a software means for utilizing the optical touch sensor to determine the amount of pressure at the touch location based on the detector electrical signal.

2. The hybrid touch system according to claim 1, further comprising a controller that include said software means and that is operably coupled to the at least one light source and the at least one detector and configured to receive the detector electrical signal and determine the change in the pressure applied at the touch location using said software means.

3. The hybrid touch system according to claim 2, further comprising the light source being wavelength modulated to form intensity modulated light at the detector.

4. The hybrid touch system claim 3, wherein the detector electrical signal is processed by the controller to determine a modulation contrast representative of the change in the pressure applied at the touch event location.

5. The hybrid touch system according to claim 1, wherein the transparent sheet is substantially transparent to infrared (IR) light, wherein the emitted light from the at least one light sources comprises IR light, and wherein the at least one detector is configured to detect the IR light.

6. The hybrid touch system according to claim 1, wherein the capacitive touch sensor comprises a projected capacitance sensor.

7. The hybrid touch system according to claim 6, wherein the projected capacitance sensor comprises a mutual capacitive sensor.

8. The hybrid touch system according to claim 1, further comprising a display unit having a display, with the optical touch sensor operably arranged adjacent the display.

9. The hybrid touch system according to claim 8, wherein the capacitive sensor is arranged between the display unit and optical touch sensor.

10. A method of determining touch locations of one or more touch events on a touch surface, and amounts of pressure associated with each touch event, comprising:
    a. detecting x- and y-positions of each of one or more touch events via a capacitive touch sensor;
    b. resolving the x- and y-positions of each of the one or more touch events via the capacitive touch sensor;
    c. detecting the amounts of pressure of each of the one or more touch events via an optical touch sensor that includes a transparent sheet having a monolithic body in the form of a single element made of a single material, the monolithic body having a lower surface and an upper surface, wherein the one or more touch events occur at the upper surface, wherein light travels within the monolithic body by total internal reflection (TIR) from the upper and lower surfaces only, and wherein the TIR light is scattered by each touch event at the top surface in proportion to an amount of contact area associated with each touch event so that a detector arranged immediately adjacent the transparent sheet generates a detector signal representative of a change in the amount of transmitted TIR light due to said light scattering in proportion to the amount of contact area; and d. resolving the amounts of pressure of each of the one or more touch events via the optical touch sensor based on the amount of contact area associated with each touch event.

11. The method according to claim 10, wherein the measuring of a change in the amount of transmitted TIR light includes measuring an attenuation of the transmitted TIR light.

12. A method of determining an (x,y) touch location of a touch event on a touch surface, and an amount of pressure associated with the touch event, comprising:
   a. detecting an occurrence of the touch event on the touch surface via an optical touch sensor;
   b. determining whether the touch event is detected by a capacitive touch sensor operably arranged relative to the optical touch sensor;
   c. whenever the touch event is detected by the capacitive touch sensor, resolving the (x,y) touch location of the touch event via a capacitive touch sensor;
   d. whenever the touch event is not detected by the capacitive touch sensor, resolving the (x,y) touch location of the touch event via the optical touch sensor; and
   e. resolving the amount of pressure at the (x,y) touch location using the optical touch sensor, wherein the optical touch sensor includes a transparent sheet having a monolithic body in the form of a single element made of a single material, the monolithic body having a lower surface and an upper surface, wherein the upper surface defines the touch surface and wherein light travels within the body by total internal reflection (TIR) from the upper and lower surfaces only, and wherein the TIR light is scattered by the touch event at the top upper surface in proportion to an amount of contact area associated with the touch event so that a detector arranged immediately adjacent the transparent sheet generates a detector signal representative of a change in the amount of transmitted TIR light due to said light scattering, and wherein resolving the amount of pressure of the touch event is based on the amount of contact area.

13. The method according to claim 12, wherein the capacitive touch sensor comprises a projected capacitance sensor.

14. The method according to claim 13, wherein the projected capacitance sensor comprises a mutual capacitive sensor.

15. The method according to claim 12, wherein the amount of contact area is defined by a finger applied to the touch surface at the touch location.

16. The method according to claim 12, wherein the optical sensor and the capacitive touch sensor are part of a display.

17. The method according to claim 12, wherein the resolving of the amount of pressure includes processing the electrical detector signals using a processor.

* * * * *